United States Patent
Ren et al.

(10) Patent No.: US 11,277,188 B2
(45) Date of Patent: Mar. 15, 2022

(54) INFORMATION TRANSMISSION METHOD AND DEVICE

(71) Applicant: HUAWEI TECHNOLOGIES CO., LTD., Guangdong (CN)

(72) Inventors: Haibao Ren, Shanghai (CN); Yi Huang, Shenzhen (CN); Yuanjie Li, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 45 days.

(21) Appl. No.: 16/579,461

(22) Filed: Sep. 23, 2019

(65) Prior Publication Data

US 2020/0036425 A1     Jan. 30, 2020

Related U.S. Application Data

(63) Continuation of application No. PCT/CN2018/080390, filed on Mar. 24, 2018.

(30) Foreign Application Priority Data

Mar. 24, 2017     (CN) .......................... 201710184951.2
May 15, 2017     (CN) .......................... 201710340109.3

(51) Int. Cl.
    *H04B 7/06*        (2006.01)
    *H04B 7/024*       (2017.01)
    (Continued)

(52) U.S. Cl.
    CPC ........... *H04B 7/0639* (2013.01); *H04B 7/024* (2013.01); *H04L 5/0051* (2013.01);
    (Continued)

(58) Field of Classification Search
    None
    See application file for complete search history.

(56) References Cited

U.S. PATENT DOCUMENTS

| | | | | |
|---|---|---|---|---|
| 2012/0213113 A1* | 8/2012 | Zhao | ................. | H04W 72/1226 370/252 |
| 2014/0011468 A1* | 1/2014 | Park | ...................... | H04B 7/086 455/272 |

(Continued)

FOREIGN PATENT DOCUMENTS

| | | |
|---|---|---|
| CN | 101873282 A | 10/2010 |
| CN | 102056220 A | 5/2011 |

(Continued)

OTHER PUBLICATIONS

Ericsson,"UL MIMO for NR",3GPP TSG-RAN WG1 #87 R1-1612320,Reno, USA, Nov. 14-18, 2016,total 3 pages.

(Continued)

*Primary Examiner* — Gregory B Sefcheck
*Assistant Examiner* — Suk Jin Kang
(74) *Attorney, Agent, or Firm* — Womble Bond Dickinson (US) LLP

(57) ABSTRACT

An information transmission method and a device are provided. The method includes: receiving antenna port grouping information from a terminal device, where the antenna port grouping information includes information about at least one antenna port group of the terminal device and information about at least one antenna port included in each antenna port group; sending indication information to the terminal device based on the antenna port grouping information, where the indication information is used to indicate an antenna port group set used by the terminal device to transmit uplink information at a first moment, the antenna port group set includes at least one first antenna port group, and the first antenna port group is one of antenna port groups indicated by the antenna port grouping information. The terminal device is prevented from continuously sending uplink information on a blocked antenna port.

11 Claims, 8 Drawing Sheets

(51) Int. Cl.
  *H04L 5/00*   (2006.01)
  *H04L 25/02*  (2006.01)
  *H04W 28/06*  (2009.01)
  *H04W 80/02*  (2009.01)

(52) U.S. Cl.
  CPC ......... *H04L 25/0226* (2013.01); *H04W 28/06* (2013.01); *H04W 80/02* (2013.01)

(56) References Cited

U.S. PATENT DOCUMENTS

| | | | | |
|---|---|---|---|---|
| 2014/0241310 | A1* | 8/2014 | Guan | H04W 72/0453 370/330 |
| 2014/0301496 | A1* | 10/2014 | Ko | H04B 7/0669 375/267 |
| 2015/0156000 | A1* | 6/2015 | Ko | H04L 5/0057 370/329 |
| 2015/0236773 | A1* | 8/2015 | Kim | H04B 7/0452 375/295 |
| 2015/0372732 | A1* | 12/2015 | Kim | H04B 7/0478 375/267 |
| 2016/0006549 | A1* | 1/2016 | Kim | H04B 17/318 370/252 |
| 2016/0013847 | A1* | 1/2016 | Kim | H04B 7/0417 375/267 |
| 2016/0262181 | A1* | 9/2016 | Lee | H04B 7/04 |
| 2016/0338040 | A1* | 11/2016 | Lee | H04W 72/0413 |
| 2016/0373178 | A1* | 12/2016 | Nam | H04B 7/0639 |
| 2017/0195100 | A1* | 7/2017 | Kim | H04L 5/0053 |
| 2017/0201307 | A1* | 7/2017 | Kim | H04B 7/04 |
| 2017/0302480 | A1* | 10/2017 | Kim | H04B 7/06 |
| 2018/0183503 | A1* | 6/2018 | Rahman | H04W 72/042 |
| 2018/0262250 | A1* | 9/2018 | Kim | H04B 7/063 |
| 2018/0262251 | A1* | 9/2018 | Kim | H04B 7/0465 |
| 2018/0287682 | A1* | 10/2018 | Kwak | H04L 5/0057 |
| 2019/0140715 | A1* | 5/2019 | Ko | H04L 27/2602 |
| 2019/0173534 | A1* | 6/2019 | Kakishima | H04W 52/24 |
| 2019/0181921 | A1* | 6/2019 | Lee | H04B 7/06 |
| 2019/0181925 | A1* | 6/2019 | Kang | H04B 7/0617 |
| 2019/0181934 | A1* | 6/2019 | Kang | H04W 72/0406 |
| 2019/0199553 | A1* | 6/2019 | Park | H04B 7/0617 |
| 2019/0207731 | A1* | 7/2019 | Park | H04B 7/0628 |
| 2019/0222277 | A1* | 7/2019 | Park | H04L 25/0226 |
| 2019/0319680 | A1* | 10/2019 | Zhang | H04B 7/0408 |
| 2019/0379501 | A1* | 12/2019 | Park | H04W 72/042 |
| 2020/0153490 | A1* | 5/2020 | Ko | H04B 7/0639 |
| 2020/0213054 | A1* | 7/2020 | Park | H04B 7/0486 |
| 2020/0403669 | A1* | 12/2020 | Park | H04B 7/0486 |
| 2021/0126676 | A1* | 4/2021 | Zhang | H04B 7/0695 |

FOREIGN PATENT DOCUMENTS

| | | |
|---|---|---|
| CN | 102083223 A | 6/2011 |
| CN | 103096493 A | 5/2013 |
| CN | 103812619 A | 5/2014 |
| CN | 104284424 A | 1/2015 |
| CN | 105991260 A | 10/2016 |
| CN | 106033990 A | 10/2016 |
| CN | 106031065 B | 6/2019 |
| EP | 3444963 A1 | 2/2019 |
| WO | 2011106996 A1 | 9/2011 |
| WO | 2016133363 A1 | 8/2016 |
| WO | 2018016700 A1 | 1/2018 |

OTHER PUBLICATIONS

Huawei et al.,"WF on UL MIMO transmission",3GPP TSG RAN WG1 NR Ad Hoc Meeting R1-1701398,Spokane, USA, Jan. 16-20, 2017,total 3 pages.

Qualcomm Incorporated,"Codebook based UL transmission",3GPP TSG RAN WG1 #88 R1-1702599,Feb. 13-17, 2017,total 3 pages.

Nokia et al.,"Codebook Design for UL MIMO",3GPP TSG-RAN WG1 #88 R1-1703152,Athens, Greece, Feb. 13-17, 2017,total 2 pages.

LG Electronics et al.,"WF on control signaling for UL-MIMO",3GPP TSG RAN1 NR Ad-Hoc R1-1703753,Athens, Greece, Feb. 13-17, 2017,total 4 pages.

* cited by examiner

Inter-group co-phasing

INFORMATION TRANSMISSION METHOD AND DEVICE

CROSS-REFERENCE TO RELATED APPLICATIONS

This application is a continuation of International Application No. PCT/CN2018/080390, filed on Mar. 24, 2018, which claims priority to Chinese Patent Application No. 201710340109.3, filed on May 15, 2017, which claims priority to Chinese Patent Application No. 201710184951.2, filed on Mar. 24, 2017, The disclosures of the aforementioned applications are hereby incorporated by reference in their entireties.

TECHNICAL FIELD

The present disclosure relates to the field of communications technologies, and in particular, to an information transmission method and a device.

BACKGROUND

Massive multiple input multiple output (Massive MIMO) can further improve a system capacity by using more spatial degrees of freedom, and is one of key technologies in the new radio access technology (NR). Compared with a terminal device in LTE, a terminal device in NR is provided with more antennas. For example, compared with the LTE which supports at most four antennas for simultaneous uplink transmission, the NR may support 8, 16, or even 32 antenna ports for simultaneous uplink transmission. In addition, a quantity of receive antennas that can be supported on a UE side increases correspondingly. In this way, an interference suppression gain, a diversity gain, and a multi-antenna combination gain can be provided through joint processing of a plurality of receive antennas.

In the prior art, a terminal device uses a plurality of fixed antenna ports to transmit uplink information. However, in an actual application scenario, there are usually abundant scatters around the terminal device, and a beam may be blocked at a high frequency. As a result, some antenna ports may be blocked. If the foregoing information transmission manner in the prior art is still used, the information transmission efficiency of the terminal device is relatively low, and power consumption of the terminal device is relatively large.

SUMMARY

The present disclosure provides an information transmission method and a device, to resolve a technical problem in the prior art that information transmission efficiency is relatively low and power consumption of a terminal device is relatively large.

According to a first aspect, an embodiment of the present disclosure provides an information transmission method, including:

receiving, by an access network device, antenna port grouping information from a terminal device, where the antenna port grouping information includes information about at least one antenna port group of the terminal device and information about at least one antenna port included in each antenna port group, or information about at least one antenna port group of the terminal device and information about antenna ports of the terminal device; and sending, by the access network device, indication information to the terminal device based on the antenna port grouping information, where the indication information is used to indicate an antenna port group set used by the terminal device to transmit uplink information at a first moment, the antenna port group set includes at least one first antenna port group, and the first antenna port group is one of antenna port groups indicated by the antenna port grouping information.

In one embodiment, when the antenna port grouping information includes the information about the at least one antenna port group of the terminal device and the information about the antenna ports of the terminal device, the method may further include:

determining, by the access network device based on the information about the at least one antenna port group of the terminal device and the information about the antenna ports of the terminal device, and a correspondence between an antenna port and an antenna port group, the information about the at least one antenna port included in each antenna port group.

In one embodiment, the information about the at least one antenna port group may be a quantity of antenna port groups.

In one embodiment, the information about the antenna ports of the terminal device may be a quantity of the antenna ports of the terminal device.

In one embodiment, the correspondence between an antenna port and an antenna port group may be that a quantity of antenna ports in each antenna port group is a quotient obtained by dividing the total quantity of the antenna ports by the quantity of antenna port groups. For example, if the terminal device reports that the terminal device has eight antenna ports and two antenna port groups, the foregoing information about the at least one antenna port included in each antenna port group is 4.

In one embodiment, the antenna port may be an antenna port that can transmit a reference signal used for channel quality sounding. For example, an antenna port used for SRS transmission may be briefly referred to as an SRS antenna port.

In one embodiment, the method further includes: sending, by the access network device, precoding matrix information to the terminal device, where the precoding matrix information is for determination of a precoding matrix W in the terminal device.

According to a second aspect, the present disclosure provides an information transmission method, including:

sending, by a terminal device, antenna port grouping information to an access network device, where the antenna port grouping information includes information about at least one antenna port group of the terminal device and information about at least one antenna port included in each antenna port group, or information about at least one antenna port group of the terminal device and information about antenna ports of the terminal device; and receiving, by the terminal device, indication information from the access network device, where the indication information is used to indicate an antenna port group set used by the terminal device to transmit uplink information at a first moment, the antenna port group set includes at least one first antenna port group, and the first antenna port group is one of antenna port groups indicated by the antenna port grouping information.

In one embodiment, when the antenna port grouping information includes the information about the at least one antenna port group of the terminal device and the information about the antenna ports of the terminal device, the antenna port grouping information may further include the information about the at least one antenna port included in each antenna port group. This is not limited in the present disclosure.

In one embodiment, the information about the at least one antenna port group may be a quantity of antenna port groups.

In one embodiment, the information about the antenna ports of the terminal device may be a quantity of the antenna ports of the terminal device.

In one embodiment, a correspondence between an antenna port and an antenna port group may be that a quantity of antenna ports in each antenna port group is a quotient obtained by dividing the total quantity of the antenna ports by the quantity of antenna port groups. For example, if the terminal device reports that the terminal device has eight antenna ports and two antenna port groups, the foregoing information about the at least one antenna port included in each antenna port group is 4.

In one embodiment, the antenna port may be an antenna port that can transmit a reference signal used for channel quality sounding. For example, an antenna port used for SRS transmission may be briefly referred to as an SRS antenna port.

In one embodiment, the method further includes:

receiving, by the terminal device, precoding matrix information sent by the access network device, where the precoding matrix information is used to determine a precoding matrix W by the terminal device.

According to the information transmission methods provided in the first aspect and the second aspect, the terminal device reports the antenna port grouping information to the access network device, and the access network device sends the indication information to the terminal device based on the antenna port grouping information. Therefore, the terminal device learns of, according to the indication information, the antenna port group set selected by the access network device for the terminal device, and when the first moment arrives, transmits uplink information by using each first antenna port group in the antenna port group set. The first antenna port group in the antenna port group set selected by the access network device for the terminal device includes at least one antenna port that has high sending efficiency, or that is not blocked, or whose beam is not blocked, thereby preventing the terminal device from continuously sending uplink information on a blocked antenna port, improving uplink information sending efficiency of the terminal device, and reducing power consumption of the terminal device.

In one embodiment of the present disclosure, the precoding matrix information includes a first transmitted precoding matrix indicator (TPMI) of a matrix $W_1$ and a second TPMI of a matrix $W_2$, $W_1$ is used to represent a phase correlation between different first antenna port groups, $W_2$ is a first precoding matrix w corresponding to the first antenna port group, each first antenna port group corresponds to the same first precoding matrix w, and the first TPMI and the second TPMI are used to determine the precoding matrix W.

In the foregoing embodiment, in one embodiment, $$W_1 = \begin{bmatrix} 1 \\ e^{j\varphi_1} \\ \Lambda \\ e^{j\varphi_{K-1}} \end{bmatrix},$$

and $W = W_1 \otimes W_2$, where K is a quantity of first antenna port groups in the antenna port group set, $\varphi_k$ is a phase correlation factor between a $k^{th}$ first antenna port group and a $1^{st}$ first antenna port group, and a value range of k is [1, K−1]; and a quantity of rows of $W_1$ equals the quantity of first antenna port groups in the antenna port group set, a quantity of rows of $W_2$ equals a total quantity of antenna ports in the first antenna port group, a quantity of columns of $W_1$ is 1, and a quantity of columns of $W_2$ is a quantity of transmission layers between the access network device and the terminal device.

In the foregoing embodiment, in one embodiment, $$W_1 = \begin{bmatrix} 1 \\ e^{j\varphi_1} \\ \Lambda \\ e^{j\varphi_{K-1}} \end{bmatrix} \otimes I_N,$$

and $W = W_1 \times W_2$, where $I_N$ is a unit matrix with N rows and N columns, N is a quantity of antenna ports in the first antenna port group, K is a quantity of first antenna port groups in the antenna port group set, $\varphi_k$ is a phase correlation factor between a $k^{th}$ first antenna port group and a $1^{st}$ first antenna port group, a value range of k is [1, K−1], a quantity of rows of $W_1$ equals a total quantity of all antenna ports in the antenna port group set, a quantity of rows of $W_2$ equals the total quantity of antenna ports in the first antenna port group, a quantity of columns of $W_1$ is the total quantity of antenna ports in the first antenna port group, and a quantity of columns of $W_2$ is a quantity of transmission layers between the access network device and the terminal device.

In another embodiment of the present disclosure, the precoding matrix information includes a fourth TPMI of a matrix $W_P$, the fourth transmitted precoding matrix indicator (TPMI) is used to represent a matrix $W_1$ of a phase correlation between different first antenna port groups and a matrix $W_2$ that equals a first precoding matrix w corresponding to the first antenna port group, and each first antenna port group corresponds to the same first precoding matrix w; and a quantity of rows of $W_P$ equals a total quantity of all antenna ports in the antenna port group set, and a quantity of columns of $W_P$ equals a quantity of transmission layers between the access network device and the terminal device.

In one embodiment, the indication information includes at least one of antenna port selection matrix information, a medium access control element (MAC CE), or at least one uplink sounding reference signal resource indicator (SRI); and different antenna port selection matrix information corresponds to different antenna port group sets, different MAC CEs correspond to different antenna port group sets, and different SRIs correspond to different antenna port groups.

In one embodiment, the antenna port selection matrix information includes an antenna port selection matrix or an identifier of the antenna port selection matrix.

Further, the antenna port selection matrix is a matrix with N rows and one column, some elements in the antenna port selection matrix are 0, one or more remaining elements are 1, and N is a quantity of antenna port groups reported by the terminal device.

In one embodiment, the first TPMI is a wideband transmitted precoding matrix indicator, and the second TPMI is a wideband transmitted precoding matrix indicator; or the first TPMI is a wideband transmitted precoding matrix indicator, the second TPMI is a subband TPMI, and the subband TPMI is used to indicate $W_2$ used by the terminal device on a subband; or the first TPMI is a subband transmitted precoding matrix indicator, and the second TPMI is a wideband transmitted precoding matrix indicator.

In the implementation of the indication information provided above, the access network device may inform, by using different forms of indication information, the terminal device of the first antenna port group that should be used by the terminal device when the first moment arrives. This diversifies manners in which the access network device indicates the first antenna port group to the terminal device.

According to a third aspect, the present disclosure provides an information transmission method, including:

receiving, by an access network device, antenna port grouping information from a terminal device, where the antenna port grouping information includes information about at least one antenna port group of the terminal device and information about at least one antenna port included in each antenna port group, or information about at least one antenna port group of the terminal device and information about antenna ports of the terminal device; and sending, by the access network device, a transmitted precoding matrix indicator (TPMI) of a precoding matrix W to the terminal device, where W is a precoding matrix related to a first precoding matrix w corresponding to a first antenna port group in an antenna port group set and a phase correlation between different first antenna port groups, the antenna port group set includes at least one first antenna port group, the first antenna port group is one of antenna port groups indicated by the antenna port grouping information, and each first antenna port group corresponds to the same first precoding matrix w; and a quantity of rows of W equals a total quantity of the antenna ports of the terminal device, and a quantity of columns of W equals a quantity of transmission layers between the access network device and the terminal device.

In one embodiment, when the antenna port grouping information includes the information about the at least one antenna port group of the terminal device and the information about the antenna ports of the terminal device, the antenna port grouping information may further include the information about the at least one antenna port included in each antenna port group. This is not limited in the present disclosure.

In one embodiment, the information about the at least one antenna port group may be a quantity of antenna port groups.

In one embodiment, the information about the antenna ports of the terminal device may be the quantity of the antenna ports of the terminal device.

In one embodiment, a correspondence between an antenna port and an antenna port group may be that a quantity of antenna ports in each antenna port group is a quotient obtained by dividing the total quantity of the antenna ports by the quantity of antenna port groups. For example, if the terminal device reports that the terminal device has eight antenna ports and two antenna port groups, the foregoing information about the at least one antenna port included in each antenna port group is 4.

In one embodiment, the antenna port may be an antenna port that can transmit a reference signal used for channel quality sounding. For example, an antenna port used for SRS transmission may be briefly referred to as an SRS antenna port.

In one embodiment, when the antenna port grouping information includes the information about the at least one antenna port group of the terminal device and the information about the antenna ports of the terminal device, the method may further include:

determining, by the access network device based on the information about the at least one antenna port group of the terminal device and the information about the antenna ports of the terminal device, and the correspondence between an antenna port and an antenna port group, the information about the at least one antenna port included in each antenna port group.

According to a fourth aspect, the present disclosure provides an information transmission method, including:

sending, by a terminal device, antenna port grouping information to an access network device, where the antenna port grouping information includes information about at least one antenna port group of the terminal device and information about at least one antenna port included in each antenna port group, or information about at least one antenna port group of the terminal device and information about antenna ports of the terminal device; and receiving, by the terminal device, a transmitted precoding matrix indicator (TPMI) of a precoding matrix W from the access network device, where W is a precoding matrix related to a first precoding matrix w corresponding to a first antenna port group in an antenna port group set and a phase correlation between different first antenna port groups, and the antenna port group set includes at least one first antenna port group, the first antenna port group is one of antenna port groups indicated by the antenna port grouping information, and each first antenna port group corresponds to the same first precoding matrix w; and a quantity of rows of W equals a total quantity of the antenna ports of the terminal device, and a quantity of columns of W equals a quantity of transmission layers between the access network device and the terminal device.

According to the information transmission methods provided in the third aspect and the fourth aspect, the access network device informs the terminal device of the TPMI for determining the precoding matrix W. The precoding matrix W considers the phase correlation between different first antenna port groups, thereby improving an inter-layer interference suppression capability when the terminal device transmits uplink data by using the precoding matrix W.

In one embodiment, when the antenna port grouping information includes the information about the at least one antenna port group of the terminal device and the information about the antenna ports of the terminal device, the antenna port grouping information may further include the information about the at least one antenna port included in each antenna port group. This is not limited in the present disclosure.

In one embodiment, the information about the at least one antenna port group may be a quantity of antenna port groups.

In one embodiment, the information about the antenna ports of the terminal device may be the quantity of the antenna ports of the terminal device.

In one embodiment, a correspondence between an antenna port and an antenna port group may be that a quantity of antenna ports in each antenna port group is a quotient obtained by dividing the total quantity of the antenna ports by the quantity of antenna port groups. For example, if the terminal device reports that the terminal device has eight antenna ports and two antenna port groups, the foregoing information about the at least one antenna port included in each antenna port group is 4.

In one embodiment, the antenna port may be an antenna port that can transmit a reference signal used for channel quality sounding. For example, an antenna port used for SRS transmission may be briefly referred to as an SRS antenna port.

According to a fifth aspect, the present disclosure provides an information transmission method, including:

receiving, by an access network device, antenna port grouping information from a terminal device, where the antenna port grouping information includes information about at least one antenna port group of the terminal device and information about at least one antenna port included in each antenna port group, or information about at least one antenna port group of the terminal device and information about antenna ports of the terminal device; and sending, by the access network device, a first transmitted precoding matrix indicator (TPMI) of a matrix $W_x$ and a second TPMI of a matrix $W_2$ to the terminal device, where $W_x$ is used to represent a selection factor used by the access network device to select an antenna port group set from the at least one antenna port group and a phase correlation between different first antenna port groups in the antenna port group set, $W_2$ is a first precoding matrix w corresponding to the first antenna port group, each first antenna port group corresponds to the same first precoding matrix w, the first antenna port group is one of antenna port groups indicated by the antenna port grouping information, and the first TPMI and the second TPMI are used for determination of a precoding matrix W.

In one embodiment, when the antenna port grouping information includes the information about the at least one antenna port group of the terminal device and the information about the antenna ports of the terminal device, the antenna port grouping information may further include the information about the at least one antenna port included in each antenna port group. This is not limited in the present disclosure.

In one embodiment, the information about the at least one antenna port group may be a quantity of antenna port groups.

In one embodiment, the information about the antenna ports of the terminal device may be a quantity of the antenna ports of the terminal device.

In one embodiment, a correspondence between an antenna port and an antenna port group may be that a quantity of antenna ports in each antenna port group is a quotient obtained by dividing the total quantity of the antenna ports by the quantity of antenna port groups. For example, if the terminal device reports that the terminal device has eight antenna ports and two antenna port groups, the foregoing information about the at least one antenna port included in each antenna port group is 4.

In one embodiment, the antenna port may be an antenna port that can transmit a reference signal used for channel quality sounding. For example, an antenna port used for SRS transmission may be briefly referred to as an SRS antenna port.

In one embodiment, when the antenna port grouping information includes the information about the at least one antenna port group of the terminal device and the information about the antenna ports of the terminal device, the method may further include:

determining, by the access network device based on the information about the at least one antenna port group of the terminal device and the information about the antenna ports of the terminal device, and the correspondence between an antenna port and an antenna port group, the information about the at least one antenna port included in each antenna port group.

According to a sixth aspect, the present disclosure provides an information transmission method, including:

sending, by a terminal device, antenna port grouping information to an access network device, where the antenna port grouping information includes information about at least one antenna port group of the terminal device and information about at least one antenna port included in each antenna port group, or information about at least one antenna port group of the terminal device and information about antenna ports of the terminal device; and receiving, by the terminal device, a first transmitted precoding matrix indicator (TPMI) of a matrix $W_x$ and a second TPMI of a matrix $W_2$ from the access network device, where W is used to represent a selection factor used by the access network device to select an antenna port group set from the at least one antenna port group and a phase correlation between different first antenna port groups in the antenna port group set, $W_2$ is a first precoding matrix w corresponding to the first antenna port group, and each first antenna port group corresponds to the same first precoding matrix w; and the first antenna port group is one of antenna port groups indicated by the antenna port grouping information, and the first TPMI and the second TPMI are used to determine a precoding matrix W.

In one embodiment, when the antenna port grouping information includes the information about the at least one antenna port group of the terminal device and the information about the antenna ports of the terminal device, the antenna port grouping information may further include the information about the at least one antenna port included in each antenna port group. This is not limited in the present disclosure.

In one embodiment, the information about the at least one antenna port group may be a quantity of antenna port groups.

In one embodiment, the information about the antenna ports of the terminal device may be a quantity of the antenna ports of the terminal device.

In one embodiment, a correspondence between an antenna port and an antenna port group may be that a quantity of antenna ports in each antenna port group is a quotient obtained by dividing the total quantity of the antenna ports by the quantity of antenna port groups. For example, if the terminal device reports that the terminal device has eight antenna ports and two antenna port groups, the foregoing information about the at least one antenna port included in each antenna port group is 4.

In one embodiment, the antenna port may be an antenna port that can transmit a reference signal used for channel quality sounding. For example, an antenna port used for SRS transmission may be briefly referred to as an SRS antenna port.

In one embodiment, $W=W_x \otimes W_2$, a quantity of rows of $W_x$ equals a quantity of first antenna port groups in the antenna port group set, a quantity of columns of $W_x$ is 1, a quantity of rows of $W_2$ is a total quantity of antenna ports in the first antenna port group, and a quantity of columns of $W_2$ is a quantity of transmission layers between the access network device and the terminal device; and M elements in $W_x$ are each a complex number of modulus 1, one or more remaining elements are 0, and M is the quantity of first antenna port groups in the antenna port group set.

In one embodiment, $W=W_x \times W_2$, a quantity of rows of $W_x$ equals the total quantity of all the antenna ports of the terminal device, a quantity of columns of $W_x$ equals a total quantity of antenna ports in the first antenna port group, a quantity of rows of $W_2$ equals the total quantity of antenna ports in the first antenna port group, and a quantity of columns of $W_2$ is a quantity of transmission layers between the access network device and the terminal device; and all elements in a same row in $W_x$ are the same, M rows of elements in $W_x$ are each a complex number of modulus 1, other rows of elements are 0, and M is a quantity of first antenna port groups in the antenna port group set.

According to the information transmission methods provided in the fifth aspect and the sixth aspect, the access network device informs the terminal device of the first TPMI and the second TPMI that are used to determine the precoding matrix W. $W_x$ corresponding to the first TPMI considers the phase correlation between different first antenna port groups, thereby improving an inter-layer interference suppression capability when the terminal device transmits uplink data by using the precoding matrix W. In addition, the access network device does not need to transmit the explicit precoding matrix W to the terminal device, and instead, the terminal device obtains the precoding matrix W through calculation based on the precoding matrix information, thereby reducing air interface overheads for transmitting the precoding matrix.

According to a seventh aspect, the present disclosure further provides an apparatus. The apparatus includes a processor and a memory. The memory is configured to store an instruction, and the processor is configured to execute the instruction stored in the memory. When the processor executes the instruction stored in the memory, the apparatus is configured to complete any method related to the user equipment described in the first aspect to the sixth aspect.

In one embodiment, the apparatus may further include a transmitter. In one embodiment, the apparatus may be a terminal device or a chip that can be disposed in a terminal device.

According to an eighth aspect, an apparatus is further provided. The apparatus includes a processor and a memory. The memory is configured to store an instruction, and the processor is configured to execute the instruction stored in the memory. When the processor executes the instruction stored in the memory, the apparatus is configured to complete any method related to the wireless network device described in the first aspect to the sixth aspect.

In one embodiment, the apparatus may further include a transmitter. In one embodiment, the apparatus may be an access network device or a chip that can be disposed in an access network device.

According to a ninth aspect, an information transmission apparatus is further provided. The information transmission apparatus includes some modules, configured to implement any method related to the foregoing terminal device. Specific modules may correspond to the method operations, and details are not described herein again.

In one embodiment, the apparatus includes one or more processors and a communications unit. The one or more processors are configured to support the apparatus in performing a function corresponding to the terminal device in the foregoing method. The communications unit is configured to support communication between the apparatus and another device, to implement a receiving and/or sending function. For example, the communications unit sends antenna port grouping information, and receives indication information from an access network device.

In one embodiment, the apparatus may further include one or more memories. The memory is configured to: couple to the processor, and store a program instruction and/or data that is suitable for the apparatus. The one or more memories may be integrated with the processor, or may be disposed independent of the processor. This is not limited in the present disclosure.

The apparatus may be an intelligent terminal, a wearable device, or the like, and the communications unit may be a transceiver or a transceiver circuit. In one embodiment, the transceiver may alternatively be an input/output circuit or interface.

The apparatus may alternatively be a communications chip. The communications unit may be an input/output circuit or interface of the communications chip.

In another embodiment, the apparatus includes a transceiver, a processor, and a memory. The processor is configured to control the transceiver or an input/output circuit to receive or send a signal, the memory is configured to store a computer program, and the processor is configured to run the computer program in the memory, to enable the apparatus to perform the method completed by the terminal device in any one of the second aspect, the fourth aspect, the sixth aspect, or any embodiment of the second, the fourth, or the sixth aspect.

According to a tenth aspect, an information transmission apparatus is further provided. The information transmission apparatus includes some modules, configured to implement any method related to the foregoing access network device. Specific modules may correspond to the method operations, and details are not described herein again.

In one embodiment, the apparatus includes one or more processors and a communications unit. The one or more processors are configured to support the apparatus in implementing a function corresponding to the access network device in the foregoing method. The communications unit is configured to support communication between the apparatus and another device, to implement a receiving and/or sending function. For example, the communications unit receives antenna port grouping information from a terminal device.

In one embodiment, the apparatus may further include one or more memories. The memory is configured to: couple to the processor, and store a program instruction and/or data that is suitable for the apparatus. The one or more memories may be integrated with the processor, or may be disposed independent of the processor. This is not limited in the present disclosure.

The apparatus may be a base station, a gNB, a TRP, or the like, and the communications unit may be a transceiver or a transceiver circuit. In one embodiment, the transceiver may alternatively be an input/output circuit or interface.

The apparatus may alternatively be a communications chip. The communications unit may be an input/output circuit or interface of the communications chip.

In another embodiment, the apparatus includes a transceiver, a processor, and a memory. The processor is configured to control the transceiver or an input/output circuit to receive or send a signal, the memory is configured to store a computer program, and the processor is configured to run the computer program in the memory, to enable the apparatus to perform the method completed by the access network device in any one of the first aspect, the third aspect, the fifth aspect, or any embodiment of the first, the third, or the fifth aspect.

According to an eleventh aspect, a computer storage medium is further provided. The computer storage medium is configured to store some instructions. When the instructions are executed, any method related to the foregoing terminal device or access network device may be completed.

According to a twelfth aspect, a computer program product is further provided. The computer program product is configured to store a program or an instruction. When the program or the instruction is executed, any method related to the foregoing terminal device or access network device may be completed.

According to a thirteenth aspect, a communications system is further provided. The communications system includes the terminal device and the access network device provided above.

Compared with the prior art, according to the information transmission method and device provided in the present disclosure, the terminal device reports the antenna port grouping information to the access network device, and the access network device sends the indication information to the terminal device based on the antenna port grouping information. Therefore, the terminal device learns of, according to the indication information, the antenna port group set selected by the access network device for the terminal device, and when the first moment arrives, transmits uplink information by using each first antenna port group in the antenna port group set. The first antenna port group in the antenna port group set selected by the access network device for the terminal device is an antenna port that has high sending efficiency, or that is not blocked, or whose beam is not blocked, thereby preventing the terminal device from continuously sending uplink information on a blocked antenna port, improving uplink information sending efficiency of the terminal device, and reducing power consumption of the terminal device.

DESCRIPTION OF EMBODIMENTS

Figure 1:
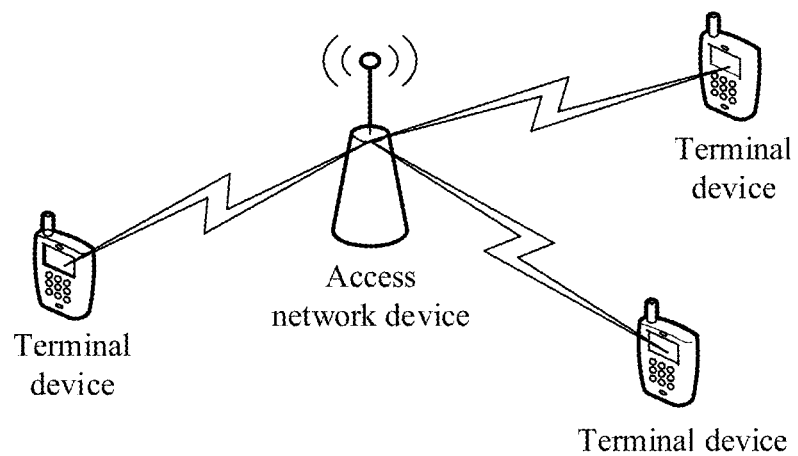
FIG. 1 is a diagram of a system network architecture according to the present disclosure.

An information transmission method and device provided in the present disclosure may be applied to a diagram of a system architecture shown in FIG. 1. As shown in FIG. 1, the system architecture includes an access network device and at least one terminal device. The terminal device has a plurality of antenna ports. In one embodiment, the terminal device may include a plurality of antenna boards, and each antenna board may include a plurality of antenna ports. This is not limited in this embodiment. For the system architecture shown in FIG. 1, the information transmission method provided in the present disclosure may be applied to a scenario in which the access network device selects a proper antenna port for the terminal device to transmit uplink data, or may be applied to a scenario in which the terminal device performs uplink precoding transmission.

The scenario in which the terminal device performs uplink precoding transmission is specifically: After a quantity of antenna ports on a terminal device side increases, data that needs to be sent is usually preprocessed by using a precoding matrix. Interference between different data streams of a same user may be reduced, thereby improving system performance. Transmitted precoding matrix indicator (TPMI) information required by the terminal device for precoding may be obtained by using downlink control information (DCI) of an access network device, or may be obtained by using reciprocity between uplink and downlink channels. Therefore, the terminal device can transmit uplink data based on a precoding matrix indicated in downlink signaling. Specifically, the TPMI information may be obtained in the following three manners:

(1) The access network device may perform uplink channel estimation based on an uplink sounding reference signal (SRS), determine, in a preset codebook, based on a result of the uplink channel estimation, a TPMI corresponding to the precoding matrix on the terminal device side, and deliver the TPMI to the terminal device by using DCI.

(2) The terminal device presets some precoding matrix transmit reference signals (these signals are reference signals coded by using the precoding matrix), a base station selects one of the reference signals based on received signal strength, and indicates the selected reference signal to the terminal device, and the terminal device precodes an uplink data channel by using the precoding matrix corresponding to the reference signal indicated by the base station.

(3) The terminal device performs channel estimation based on a downlink channel state information reference signal (CSI-RS), and calculates an uplink precoding matrix based on the reciprocity between uplink and downlink channels.

Usually, for each rank, a quantity of precoding matrices are designed in a system to represent quantized channels or direction vectors corresponding to channels. The designed precoding matrices form a codebook, each precoding matrix in the codebook corresponds to one or more precoding matrix indexes, and a precoding matrix index usually has a correspondence with a corresponding TPMI. It should be noted that, the codebook is predefined, and the access network device and the terminal device both store the corresponding codebook, and have a consistent understanding about a correspondence between each precoding matrix, precoding matrix index, and PMI in the codebook. After selecting a precoding matrix from the defined codebook based on an estimated uplink channel and determining a precoding matrix index of the precoding matrix, the access network device only needs to inform, by using downlink signaling (for example, physical layer signaling DCI), the terminal device of a TPMI corresponding to the selected precoding matrix, and the terminal device can determine the specific precoding matrix based on the signaling delivered by the access network device.

In addition, it should be noted that, to reduce costs on the terminal device side, a quantity of receive channels on the terminal device side is usually greater than a quantity of transmit channels (the channel herein is a radio frequency channel between an antenna port and a radio frequency circuit). Therefore, the quantity of transmit channels of the terminal device is usually defined as a maximum quantity of transmit antenna ports used at the same time. The terminal device sends an uplink sounding signal on different antenna ports at different moments (in one embodiment, different antenna ports may be connected to a same radio frequency channel by using a switch), so that the base station may measure uplink channel information between different antenna ports and the access network device.

The access network device shown in FIG. 1 may be a device that is in an access network and that communicates with a wireless terminal over an air interface through at least one sector. In one embodiment, the radio access network device may be configured to perform mutual conversion between a received over-the-air frame and an IP packet, and serve as a router between the wireless terminal and a remaining part of the access network, where the remaining part of the access network may include an Internet protocol (IP) network. In one embodiment, the access network device may further coordinate attribute management of the air interface. In one embodiment, the radio access network device may be a base station, and the base station may be a NodeB in WCDMA, or may be an evolved NodeB (eNodeB or eNB or e-NodeB) in LTE, or may be a transmission reception point (TRP) in 5G. This is not limited in the present disclosure.

The terminal device in FIG. 1 may be user equipment (UE), and is a device that provides voice and/or data connectivity for a user, for example, a handheld device or a vehicle-mounted device that has a wireless connection function. In one embodiment, the device may be a handheld device with a wireless connection function, or another processing device connected to a wireless modem. In addition, the wireless terminal may communicate with one or more core networks by using a radio access network (RAN). For example, the wireless terminal may be specifically a mobile terminal, such as a mobile phone (also referred to as a "cellular" phone) and a computer with a mobile terminal. The computer with a mobile terminal may be a portable, pocket-sized, handheld, computer built-in, or in-vehicle mobile apparatus, which exchanges voice and/or data with the core networks. In addition, in one embodiment, the terminal device in the present disclosure may be, for example, a device that includes one antenna board in an LTE system, or may be a device that includes a plurality of antenna boards, each of which includes a plurality of antenna ports.

It may be understood that "at least one" in the embodiments of the present disclosure refers to one or more.

In addition, the present disclosure may not be only applicable to a 5G system, but also applicable to a wireless communications system such as a universal mobile telecommunications system (UMTS), a CDMA system, or a wireless local area network (WLAN).

In the prior art, a terminal device uses a plurality of fixed antenna ports to transmit uplink information. However, there are usually abundant scatters around the terminal device, and a beam may be blocked at a high frequency. As a result, some antenna ports may be blocked. If the foregoing information transmission manner is still used, information transmission efficiency of the terminal device is relatively low, and power consumption of the terminal device is relatively large. Therefore, the present disclosure provides an information transmission method and a device, to resolve the foregoing technical problem in the prior art.

The following uses specific embodiments to describe in detail the technical solutions of the present disclosure and how the foregoing technical problem is resolved by using the technical solutions of the present disclosure. The following several specific embodiments may be combined with each other, and a same or similar concept or process may not be described repeatedly in some embodiments.

Figure 2:
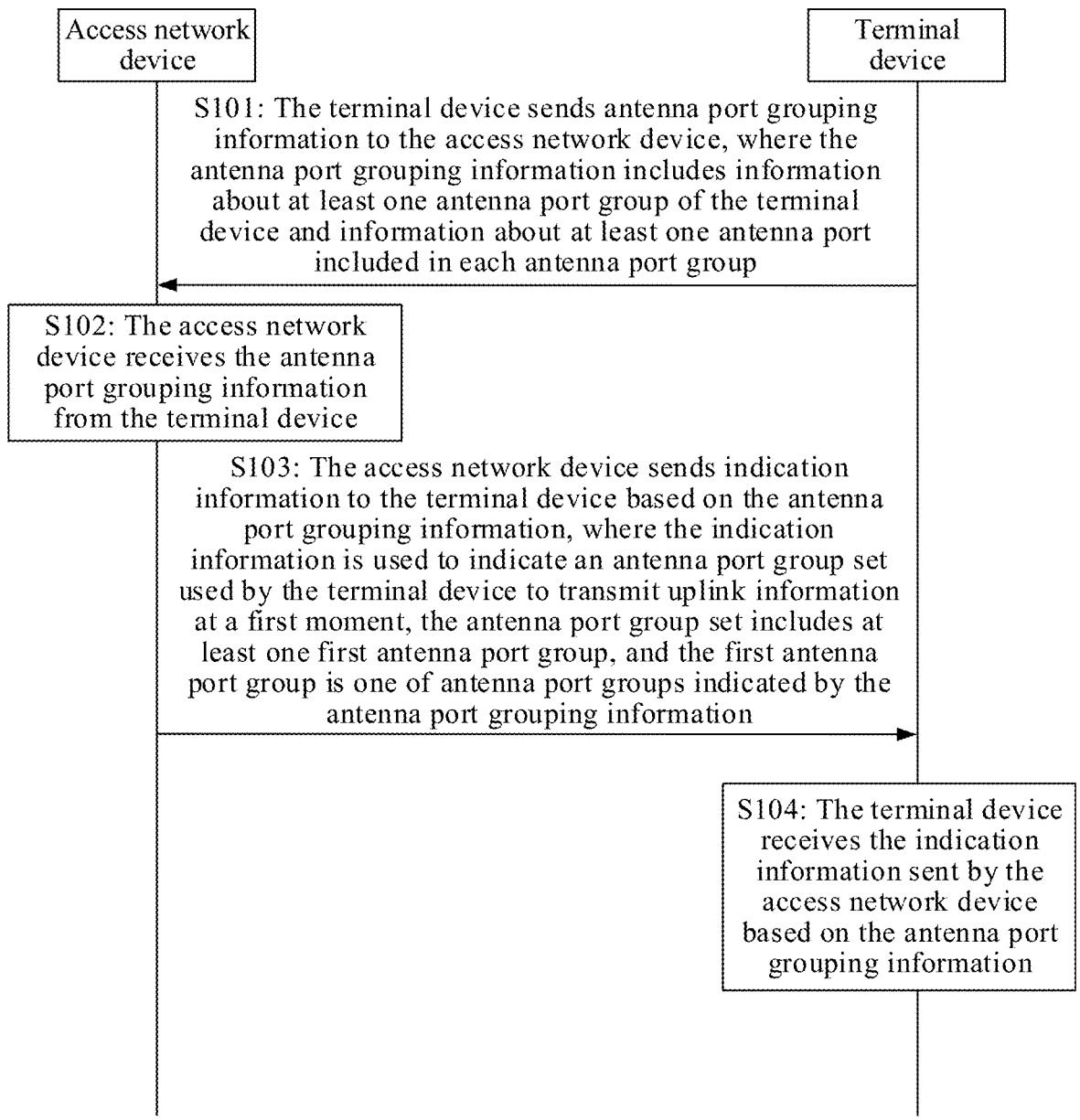
FIG. 2 is a signaling flowchart of an embodiment of an information transmission method according to the present disclosure.

FIG. 2 is a signaling flowchart of an embodiment of an information transmission method according to the present disclosure. This embodiment relates to a specific process in which after a terminal device reports antenna port grouping information of the terminal device to an access network device, the access network device selects a proper antenna port group for the terminal device to transmit uplink data. As shown in FIG. 2, the method includes the following operations.

Operation S101: The terminal device sends the antenna port grouping information to the access network device, where the antenna port grouping information includes information about at least one antenna port group of the terminal device and information about at least one antenna port included in each antenna port group, or information about at least one antenna port group of the terminal device and information about antenna ports of the terminal device.

Figure 3:
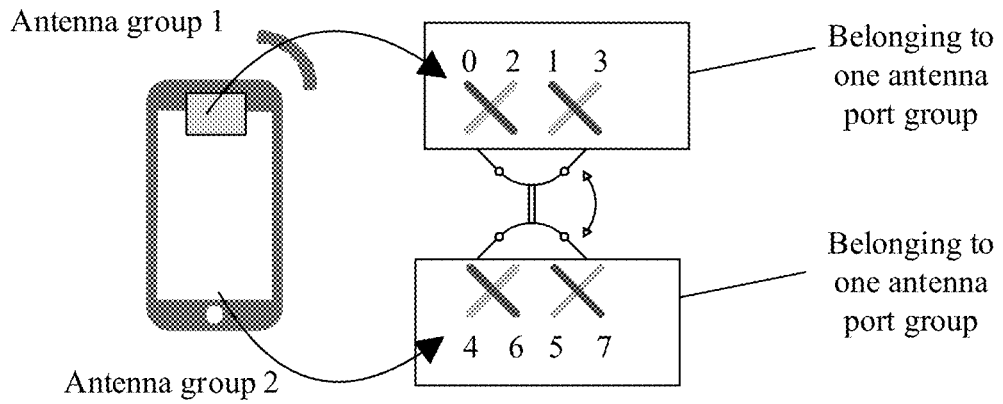
FIG. 3 is a schematic diagram of grouping antenna ports according to the present disclosure.
Figure 3A:
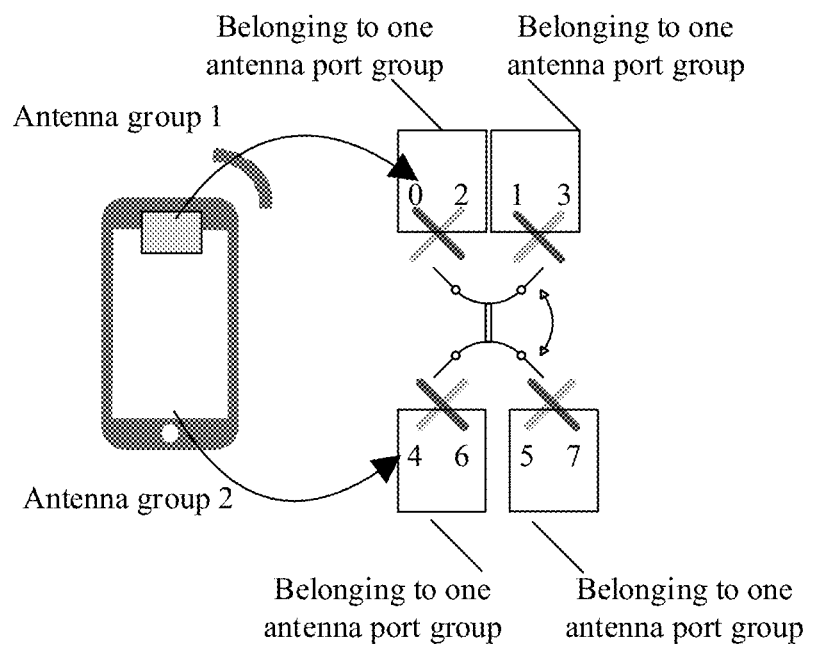
FIG. 3a is a schematic diagram of grouping antenna ports according to the present disclosure.
Figure 3B:
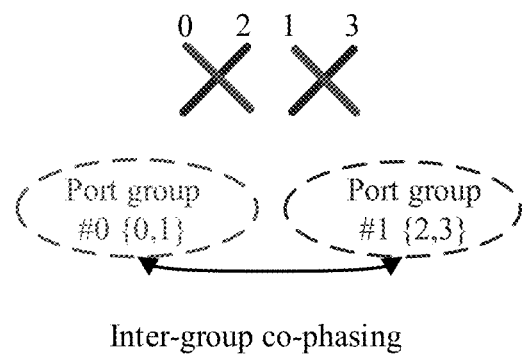
FIG. 3b is a schematic diagram of grouping antenna ports according to the present disclosure.

Specifically, in the present disclosure, the terminal device has a plurality of antenna ports, and the terminal device groups the plurality of antenna ports. In one embodiment, the terminal device may group antenna ports that perform sending simultaneously into one group, or may group a plurality of antenna ports that locate together into one group. How the terminal device groups the antenna ports is not limited in this embodiment. In one embodiment, the access network device may configure, by using higher layer signaling, a manner in which the terminal device groups the antenna ports and reports the grouping information. The higher layer signaling may be a radio resource control RRC message or a medium access control control element (MAC CE). When the terminal device has a plurality of antenna boards, the terminal device may group antenna ports on one antenna board into one group. For example, as shown in FIG. 3, the terminal device has eight antenna ports in total, the eight antenna ports may be grouped into two groups, each group has four antenna ports that can perform sending simultaneously, and the two antenna port groups are {0, 1, 2, 3} and {4, 5, 6, 7}. The terminal device may send an uplink sounding signal in a time division manner, so that the access network device obtains a complete channel including channels of the eight antenna ports. For another example, as shown in FIG. 3a, two cross-polarized antennas or adjacent co-polarized antennas may experience a similar channel characteristic, for example, be blocked or undergo a deep fade simultaneously. Therefore, such antenna ports experiencing the same channel characteristic are grouped into one antenna port group. Antenna ports in FIG. 3a may be grouped into four antenna port groups: {0, 2}, {1, 3}, {4, 6}, and {5, 7}. For another example, as shown in FIG. 3b, antennas in each group of cross-polarized antennas have strong correlation with each other, and different groups of cross-polarized antennas have weak correlation with each other. Therefore, antenna ports may be grouped into different antenna port groups based on correlation between the antennas, and antennas belonging to a same antenna port group have strong correlation. Four antenna ports shown in FIG. 3b are grouped into two groups: {0, 1} and {2, 3}.

After grouping the antenna ports of the terminal device into the antenna port groups, the terminal device reports the antenna port grouping information to the access network device. The antenna port grouping information includes the information about the at least one antenna port group of the terminal device and the information about the at least one antenna port included in each antenna port group. That is, the terminal device informs the access network device of a quantity of antenna port groups on the terminal device. Alternatively, the antenna port grouping information may include the information about the at least one antenna port group of the terminal device and information about a total quantity of the antenna ports, and the access network device may obtain, based on the information about the total quantity of the antenna ports and the information about the at least one antenna port group, the information about the at least one antenna port included in each antenna port group.

In one embodiment, the access network device may determine, based on the information about the total quantity of the antenna ports and the information about the at least one antenna port group, and a correspondence between an antenna port and an antenna port group, the information about the at least one antenna port included in each antenna port group. For example, the correspondence between an antenna port and an antenna port group may be that a quantity of antenna ports included in each antenna port group is a quotient obtained by dividing the total quantity of the antenna ports by the quantity of antenna port groups. For example, if the terminal device reports that the total quantity of the antenna ports is 8, and the antenna ports are grouped into two antenna port groups, the quantity of antenna ports included in each antenna port group is 8/2=4. Alternatively, the correspondence may be another consistent rule between the access network device and the terminal device. This is not limited herein.

In one embodiment, the antenna port may be an antenna port that can transmit a reference signal used for channel quality sounding. For example, an antenna port used for SRS transmission may be briefly referred to as an SRS antenna port.

Operation S102: The access network device receives the antenna port grouping information from the terminal device.

Operation S103: The access network device sends indication information to the terminal device based on the antenna port grouping information, where the indication information is used to indicate an antenna port group set used by the terminal device to transmit uplink information at a first moment, the antenna port group set includes at least one first antenna port group, and the first antenna port group is one of antenna port groups indicated by the antenna port grouping information.

Specifically, after the access network device receives the antenna port grouping information sent by the terminal device, in one embodiment, the access network device may determine whether some antenna ports of the terminal device meet a preset condition, to determine whether to select, for the terminal device, an antenna port group set suitable for sending. In one embodiment, the access network device may perform channel estimation based on an uplink sounding reference signal sent by the terminal device by using each antenna port group, and determine, based on a result of the channel estimation, antenna port groups corresponding to relatively poor or good channel quality, to determine that some antenna ports of the terminal device meet the preset condition. In one embodiment, the access network device may alternatively determine, based on channel reception strength of a received demodulation reference signal, antenna port groups corresponding to relatively poor or good channel quality, to determine that some antenna ports of the terminal device meet the preset condition. An implementation of the preset condition is not limited in the present disclosure. After the access network device determines that some antenna ports of the terminal device meet the preset condition, the access network device may send the indication information to the terminal device based on the antenna port grouping information reported by the terminal device, to inform the terminal device of the antenna port group set selected for the terminal device. Therefore, when the first moment arrives, the terminal device transmits uplink information by using the first antenna port group in the antenna port group set. The antenna port group set selected by the access network device includes at least one first antenna port group, and the first antenna port group is one of the antenna port groups indicated by the antenna port grouping information. Each first antenna port group in the antenna port group set is an antenna port that is selected by the access network device and that has high sending efficiency, or that is not blocked, or whose beam is not blocked.

In one embodiment, the first moment may be determined based on a moment at which the terminal device receives the indication information. For example, assuming that the terminal device receives the indication information in a time unit n, the first moment may be a time unit n+k. That is, when the terminal device transmits uplink information in the time unit n+k, each first antenna port group in the antenna port group set should be used, to prevent the terminal device from continuously sending uplink information on a blocked antenna port, thereby improving uplink information sending efficiency of the terminal device, and reducing power consumption of the terminal device. The time unit is a predefined basic unit, and may be a subframe, a slot, or a mini-slot including one or more symbols. This is not limited in the present disclosure.

Operation S104: The terminal device receives the indication information sent by the access network device based on the antenna port grouping information.

According to the information transmission method provided in the present disclosure, the terminal device reports the antenna port grouping information to the access network device, and the access network device sends the indication information to the terminal device based on the antenna port grouping information. Therefore, the terminal device learns of, according to the indication information, the antenna port group set selected by the access network device for the terminal device, and when the first moment arrives, transmits uplink information by using each first antenna port group in the antenna port group set. The first antenna port group in the antenna port group set selected by the access network device for the terminal device is an antenna port that has high sending efficiency, or that is not blocked, or whose beam is not blocked, thereby preventing the terminal device from continuously sending uplink information on a blocked antenna port, improving uplink information sending efficiency of the terminal device, and reducing power consumption of the terminal device.

In one embodiment, the terminal device may further calculate, with reference to the antenna port group set that is used for uplink transmission and that is obtained according to the indication information, and with reference to a quantity of antenna ports included in each first antenna port group in the antenna port group set, a quantity of antenna ports corresponding to a codebook used for precoding. For example, when each antenna port group of the terminal device includes four antenna ports, and the access network device indicates that two antenna port groups of the terminal device are selected, a subsequent transmitted precoding indicator (TPMI) indicates a code word corresponding to a codebook of eight antenna ports.

Based on the foregoing embodiment, the indication information may include any one of antenna port selection matrix information, a medium access control control element (MAC CE), or at least one uplink sounding reference signal resource indicator (SRI); and different antenna port selection matrix information corresponds to different antenna port group sets, different MAC CEs correspond to different antenna port group sets, and different SRIs correspond to different antenna port groups.

Specifically, when the indication information is a MAC CE, the access network device may semi-statically or dynamically inform, by using the MAC CE, the terminal device of the antenna port group set selected by the access network device for the terminal device. For example, an antenna port group selection result is indicated by using a bitmap, and the antenna port group selection result is the antenna port group set. For example, based on the example in S101, it is assumed that two bits are used to indicate a selection result of the two antenna port groups. If the indication is 01, the first antenna port group including the four antenna ports {4, 5, 6, 7} is selected for uplink transmission, and if the indication is 10, the first antenna port group including the four antenna ports {0, 1, 2, 3} is selected for uplink transmission. In one embodiment, the quantity of antenna ports in each antenna port group indicated by the antenna port grouping information reported by the terminal device may be determined by the terminal device based on an implementation. In this case, it may be considered by default that antenna ports in one antenna port group may perform uplink transmission simultaneously. In one embodiment, the quantity may alternatively be configured by the access network device. For example, the access network device configures that the terminal device groups the antenna ports into groups each including two antenna ports. In this case, in addition to reporting the antenna port grouping information, the terminal device may further introduce an additional indication field, to indicate antenna port groups that can perform uplink transmission simultaneously. For example, based on the example in S101, the terminal device indicates, by using the indication field, that the antenna port group {0, 1} and the antenna port group {2, 3} can perform uplink transmission simultaneously. In one embodiment, the quantity of antenna ports in each antenna port group indicated by the antenna port grouping information may be predefined by a communications system, and the terminal device also needs to indicate antenna port groups that can perform uplink transmission simultaneously.

When the indication information is an SRI, the access network device may indicate, by using an SRI that is in delivered DCI and that is used to indicate SRS resource information, the antenna port group set selected by the access network device for the terminal device. In one embodiment, the access network device may configure different SRS resources for different antenna port groups, and different SRS resources have different identifiers (that is, SRIs). Alternatively, the access network device configures resources corresponding to different ports of a same SRS resource for different antenna port groups, and SRS resources corresponding to different antenna ports have different identifiers (that is, SRIs). After the access network device selects one or more first antenna port groups for the terminal device from the at least one antenna port group indicated by the antenna port grouping information of the terminal device, the access network device delivers, by using DCI, an SRI corresponding to each first antenna port group to the terminal device, so that the terminal device learns of antenna port groups that should be used to transmit uplink data when the first moment arrives.

When the indication information is antenna port selection matrix information, the antenna port selection matrix information may be an explicit antenna port selection matrix W0, or may be an identifier of W0. The antenna port selection matrix W0 is a matrix with N rows and one column, some elements in W0 are 0, one or more remaining elements are 1, and N is the quantity of antenna port groups reported by the terminal device. It should be noted that, when the indication information is an antenna port selection matrix, the terminal device needs to sort and number all antenna port groups of the terminal device. Still based on the example in S101, it is assumed that the antenna port group {0, 1, 2, 3} is a first antenna port group, and the antenna port group {4, 5, 6, 7} is a second antenna port group.

When the antenna port selection matrix information is the explicit matrix W0, the indication information informed by the access network device to the terminal device is the explicit matrix W0. For example, when W0 is $$\begin{pmatrix} 1 \\ 0 \end{pmatrix},$$

it indicates that the first antenna port group is selected, and when W0

$$\begin{pmatrix} 0 \\ 1 \end{pmatrix},$$

it indicates that the second antenna port group is selected. In this case, W0 is associated with the antenna port group indicated by the antenna port grouping information reported by the UE. That is, after the terminal device reports the antenna port grouping information to the access network device, an antenna port selection matrix set corresponding to the antenna port grouping information is determined, and the antenna port selection matrix set includes a plurality of antenna port selection matrices. For example, it is assumed that the antenna port grouping information reported by the terminal device indicates that the terminal device has four antenna port groups, and it is determined, based on capability information of the terminal device, that antenna ports in each antenna port group cannot perform sending simultaneously, the antenna port selection matrix set corresponding to the antenna port grouping information may include the following four matrices:

$$\begin{pmatrix} 1 \\ 0 \\ 0 \\ 0 \end{pmatrix}, \begin{pmatrix} 0 \\ 1 \\ 0 \\ 0 \end{pmatrix}, \begin{pmatrix} 0 \\ 0 \\ 1 \\ 0 \end{pmatrix}, \begin{pmatrix} 0 \\ 0 \\ 0 \\ 1 \end{pmatrix}.$$

For another example, it is assumed that the antenna port grouping information reported by the terminal device indicates that the terminal device has four antenna port groups, and it is determined, based on capability information of the terminal device, that an antenna port 1 and an antenna port 2 can perform sending simultaneously and an antenna port 3 and an antenna port 4 can perform sending simultaneously, the antenna port selection matrix set corresponding to the antenna port grouping information may further include the following two matrices in addition to the foregoing four matrices:

$$\begin{pmatrix}1\\1\\0\\0\end{pmatrix}, \begin{pmatrix}0\\0\\1\\1\end{pmatrix}.$$

Certainly, W0 in the antenna port selection matrix set may alternatively have other possibilities. For example, for four antenna port groups, the antenna port selection matrix set that may be used includes 15 types of W0. Details are not described herein again.

When the antenna port selection matrix information is the identifier of the matrix W0. That is, a same antenna port matrix set is predefined on the access network device and the terminal device side, and each antenna port selection matrix in the antenna port selection matrix set is numbered or identified. In this way, when the access network device informs the terminal device of the identifier of W0, the terminal device can learn of the corresponding matrix W0, and then determines, with reference to values or structures of elements in the matrix W0, first antenna port groups that are selected by the access network device for the terminal device. For example, still based on the example in the foregoing embodiment, assuming that the antenna port grouping information reported by the terminal device indicates that the terminal device has four antenna port groups, the antenna port selection matrix set is fixed and may be:

$$\begin{pmatrix}1\\0\\0\\0\end{pmatrix}, \begin{pmatrix}0\\1\\0\\0\end{pmatrix}, \begin{pmatrix}0\\0\\1\\0\end{pmatrix}, \begin{pmatrix}0\\0\\0\\1\end{pmatrix}, \begin{pmatrix}1\\1\\0\\0\end{pmatrix}, \begin{pmatrix}0\\1\\1\\0\end{pmatrix}, \begin{pmatrix}1\\0\\1\\0\end{pmatrix},$$

$$\begin{pmatrix}1\\0\\0\\1\end{pmatrix}, \begin{pmatrix}0\\1\\1\\0\end{pmatrix}, \begin{pmatrix}0\\1\\0\\1\end{pmatrix}, \begin{pmatrix}1\\1\\1\\0\end{pmatrix}, \begin{pmatrix}1\\1\\0\\1\end{pmatrix}, \begin{pmatrix}0\\1\\1\\1\end{pmatrix}, \begin{pmatrix}1\\0\\1\\1\end{pmatrix}, \begin{pmatrix}1\\1\\1\\1\end{pmatrix}.$$

It should be noted that, in the present disclosure, a form of W0 is not limited to a column vector, and may be in another form, for example:

$$\begin{pmatrix}1&0&0&0\\0&0&0&0\\0&0&0&0\\0&0&0&0\end{pmatrix}, \begin{pmatrix}0&0&0&0\\0&1&0&0\\0&0&0&0\\0&0&0&0\end{pmatrix}, \begin{pmatrix}0&0&0&0\\0&0&0&0\\0&0&1&0\\0&0&0&0\end{pmatrix},$$

$$\begin{pmatrix}0&0&0&0\\0&0&0&0\\0&0&0&0\\0&0&0&1\end{pmatrix}, \begin{pmatrix}1&0&0&0\\0&1&0&0\\0&0&0&0\\0&0&0&0\end{pmatrix}, \begin{pmatrix}0&0&0&0\\0&1&0&0\\0&0&1&0\\0&0&0&1\end{pmatrix}, \begin{pmatrix}1&0&0&0\\0&1&0&0\\0&0&1&0\\0&0&0&0\end{pmatrix},$$

$$\begin{pmatrix}1&0&0&0\\0&0&0&0\\0&0&0&0\\0&0&0&1\end{pmatrix}, \begin{pmatrix}0&0&0&0\\0&1&0&0\\0&0&1&0\\0&0&0&0\end{pmatrix}, \begin{pmatrix}0&0&0&0\\0&1&0&0\\0&0&0&0\\0&0&0&1\end{pmatrix}, \begin{pmatrix}1&0&0&0\\0&1&0&0\\0&0&1&0\\0&0&0&0\end{pmatrix},$$

$$\begin{pmatrix}1&0&0&0\\0&1&0&0\\0&0&0&0\\0&0&0&1\end{pmatrix}, \begin{pmatrix}1&0&0&0\\0&0&0&0\\0&0&1&0\\0&0&0&1\end{pmatrix}, \begin{pmatrix}0&0&0&0\\0&1&0&0\\0&0&1&0\\0&0&0&1\end{pmatrix}, \begin{pmatrix}1&0&0&0\\0&1&0&0\\0&0&1&0\\0&0&0&1\end{pmatrix},$$

where an antenna port set corresponding to a row or column number with an element 1 is selected. It should be noted that any matrix design corresponding to the same function shall fall with the protection scope of the present disclosure. Details are not described herein.

The access network device may number each antenna port selection matrix W0, for example, may implement numbering by using four bits, and adds an identifier of W0 to the DCI delivered to the terminal device, to indicate specific W0 to the terminal device, and enable the terminal device to determine, based on W0, first antenna port groups to be used for uplink transmission.

Based on the above, the access network device may inform, by using different forms of indication information, the terminal device of the first antenna port group that should be used by the terminal device when the first moment arrives. This diversifies manners in which the access network device indicates the first antenna port group to the terminal device.

Figure 4:
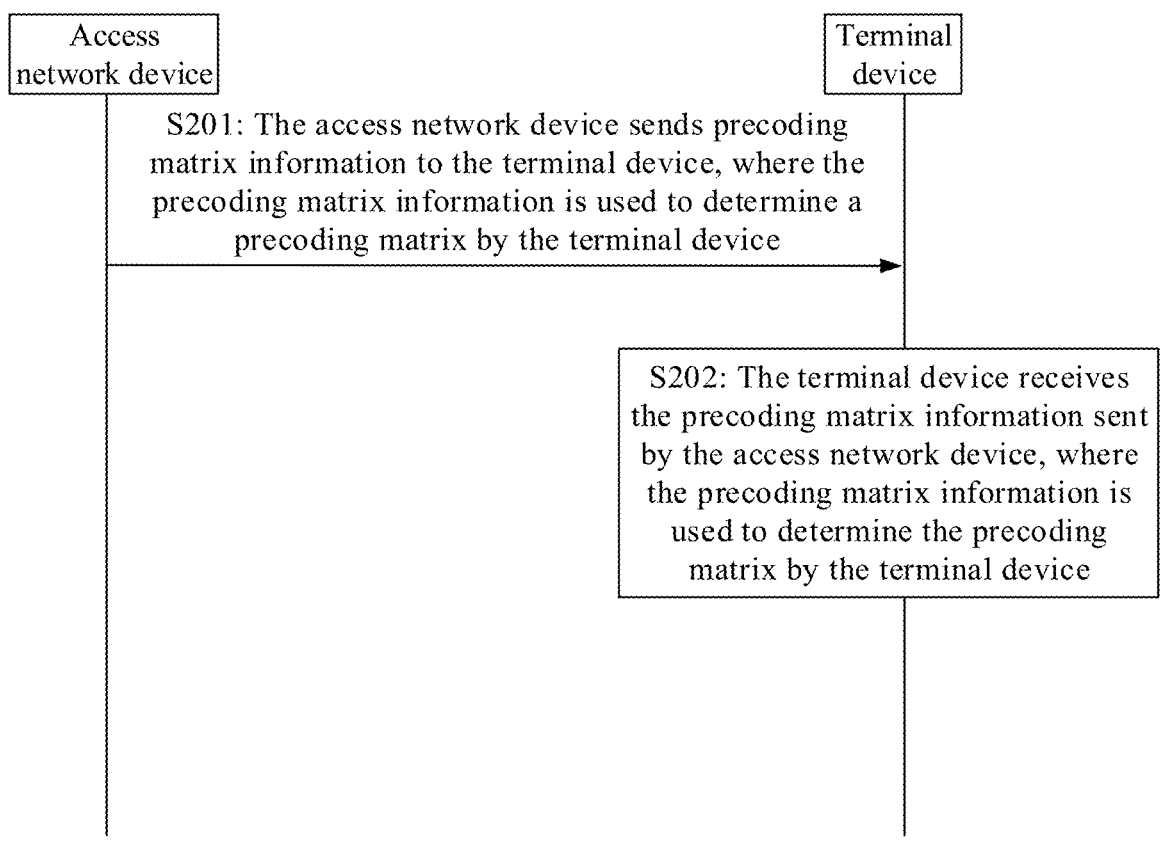
FIG. 4 is a signaling flowchart of Embodiment 2 of an information transmission method according to the present disclosure.

FIG. 4 is a signaling flowchart of Embodiment 2 of an information transmission method according to the present disclosure. This embodiment relates to a specific process in which the access network device not only delivers the foregoing indication information to the terminal device, but also sends precoding matrix information to the terminal device, so that the terminal device can precode a plurality of pieces of to-be-sent data when sending the data by using the antenna port group set. Based on the foregoing embodiment, further, the method further includes the following operations.

Operation S201: The access network device sends precoding matrix information to the terminal device, where the precoding matrix information is used for determination of a precoding matrix W in the terminal device.

Operation S202: The terminal device receives the precoding matrix information sent by the access network device, where the precoding matrix information is used to determine the precoding matrix W by the terminal device.

Specifically, when the first moment arrives, the terminal device needs to transmit uplink data by using each first antenna port group in the antenna port group set selected by the access network device for the terminal device. Therefore, to suppress inter-layer interference and improve uplink coverage or beamforming gains, the terminal device needs to precode a plurality of pieces of to-be-sent data, that is, the terminal device needs to learn of the precoding matrix used for precoding.

Therefore, after the access network device sends the indication information to the terminal device, the access network device sends the precoding matrix information to the terminal device, and the terminal device may obtain, based on the precoding matrix information, the precoding matrix needed by the terminal device.

Before the precoding matrix W provided in the present disclosure is described, a matrix $W_1$ and a matrix $W_2$ that are related to the precoding matrix W in the following embodiments are first described. The precoding matrix $W_1$ is used to represent a phase correlation between different first antenna port groups, and the matrix $W_2$ is a first precoding matrix w corresponding to the first antenna port group. It should be noted that each first antenna port group in the antenna port group set corresponds to the same first precoding matrix w.

In one embodiment, in this implementation, $W_1 = A$, and sponding to a first antenna port group including four antenna ports, and a precoding matrix corresponding to another antenna port group is generated by using a similar structure), $W_n^{\{s\}}$ indicates that the first precoding matrix w may be defined as a column number that corresponds to each element in a set $\{s\}$ and that is extracted from $W_n = I - 2u_n u_n^H / u_n^H h_n$, I is a unit matrix with four rows and four columns, and $u_n$ is given in the second column in Table 1. In one embodiment, w may alternatively correspond to a precoding vector in codebook tables 5.3.3A.2-1, 5.3.3A.2-2, 5.3.3A.2-3, 5.3.3A.2-4, and 5.3.3A.2-5 in 3GPP TS 36.211-c50.

TABLE 1

First precoding matrix corresponding to a first antenna port group of antenna ports

| TPMI | | Transmission layer ι | | | |
|---|---|---|---|---|---|
| 2 | $u_n$ | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

$$A = \begin{bmatrix} 1 \\ e^{j\varphi_1} \\ \Lambda \\ e^{j\varphi_{K-1}} \end{bmatrix},$$

where K is a quantity of first antenna port groups in the antenna port group set, $\varphi_k$ is a phase correlation factor between a $k^{th}$ first antenna port group and a $1^{st}$ first antenna port group, and the matrix $W_2 = w$. In one embodiment, each column in w is a column vector in $$\begin{bmatrix} 1 & e^{j\frac{2\pi m}{N}} & \ldots & e^{j\frac{2\pi m(N-1)}{N}} \end{bmatrix}^T,$$

m = 0, ..., N−1, and N is a quantity of antenna ports included in each antenna port group. In one embodiment, each column in may alternatively be a column vector in $$\begin{bmatrix} 1 & e^{j\frac{2\pi m}{ON}} & \ldots & e^{j\frac{2\pi m(N-1)}{ON}} \end{bmatrix}^T,$$

m = 0, ..., ON−1, N is a quantity of antenna ports included in each antenna port group, and O represents an oversampling factor, is an integer greater than or equal to 1, and may be configured by the access network device to the terminal device by using downlink signaling. In one embodiment, w may alternatively correspond to a matrix similar to $W_n^{\{s\}}$ in Table 1 (Table 1 provides a first precoding matrix w corre- Based on the foregoing description of the matrix $W_1$ and the matrix $W_2$, several embodiments of the foregoing precoding matrix information are described in the following.

In a first possible implementation of this embodiment, the precoding matrix information includes a first transmitted precoding matrix indicator (TPMI) of the matrix $W_1$ and a second TPMI of the matrix $W_2$.

Specifically, after the access network device selects the antenna port group set for the terminal device, the access network device performs channel estimation based on a reference signal corresponding to the antenna port group set, to obtain a channel estimation result H corresponding to the antenna port group set, respectively determines, by using H, the matrix $W_1$ and the matrix $W_2$ in a first codebook (the first codebook is a codebook related to a correspondence between the matrix $W_1$ and the first TPMI) and a second codebook (the second codebook is a codebook related to a correspondence between the matrix $W_2$ and the second TPMI) that are preset by the access network device. For example, the access network device may determine, based on a result of multiplying the matrix $W_1$ by the matrix $W_2$, a multiplication result closet to a unitary matrix obtained after SVD decomposition is performed on the channel matrix H, and then determines the matrix $W_1$ and the matrix $W_2$ based on the closest multiplication result, to determine the first TPMI and the second TPMI.

The access network device then informs the terminal device of the first TPMI of the matrix $W_1$ and the second TPMI of the matrix $W_2$. Because the access network device side and the terminal device side share the first codebook and the second codebook, after receiving the first TPMI and the second TPMI, the terminal device learns of, with reference to the previously received indication information, the quantity of antenna ports used for sending, and therefore can determine a quantity of rows of $W_1$, and then learns of the first TPMI found from the first codebook, so as to obtain the matrix $W_1$. In addition, because the terminal device already knows the quantity of antenna ports in the first antenna port group, the terminal device finds, with reference to the quantity of antenna ports in the first antenna port group, the second codebook corresponding to the quantity, and then finds the matrix $W_2$ from the codebook with reference to the second TPMI, so that the terminal device can calculate the precoding matrix W based on the matrix $W_1$, the matrix $W_2$, and a corresponding formula. In one embodiment, the "corresponding formula" mentioned herein may be informed by the access network device to the terminal device by using a higher layer message, for example, may be explicitly sent by using an RRC message or a MAC CE message, or explicitly sent by using a physical layer message, or may be predefined by the access network device and the terminal device. The present disclosure does not limit how the terminal device learns of the formula for calculating the precoding matrix W. In one embodiment, the formula may be $W=W_1 \otimes W_2$, or may be $W=W_1 \times W_2$.

In one embodiment, when $W=W_1 \otimes W_2$, that is, the formula is the Kronecker product, a quantity of rows of $W_1$ equals a quantity of first antenna port groups in the antenna port group set, a quantity of rows of $W_2$ equals a total quantity of antenna ports in the first antenna port group, a quantity of columns of $W_1$ is 1, and a quantity of columns of $W_2$ is a quantity of transmission layers between the access network device and the terminal device.

In one embodiment, when $W=W_1 \times W_2$, in this optional manner, $W_1 = A \otimes I_N$, that is, $$W_1 = \begin{bmatrix} 1 \\ e^{j\varphi_1} \\ \Lambda \\ e^{j\varphi_{K-1}} \end{bmatrix} \otimes I_N,$$

where $I_N$ is an N-dimensional unit matrix, and $W_2$ is the same as the foregoing $W_2$. A quantity of rows of $W_1$ equals a total quantity of all antenna ports in the antenna port group set, a quantity of rows of $W_2$ equals a total quantity of antenna ports in the first antenna port group, a quantity of columns of $W_1$ is the total quantity of antenna ports in the first antenna port group, and a quantity of columns of $W_2$ is a quantity of transmission layers between the access network device and the terminal device.

In conclusion, in this implementation, the terminal device may obtain, by using the matrix $W_1$ indicated by the first TPMI and the matrix $W_2$ indicated by the second TPMI, the precoding matrix W to be used by the terminal device, a quantity of rows of the calculated W equals the total quantity of all antenna ports in the antenna port group set, and the quantity of rows of W equals the quantity of transmission layers between the access network device and the terminal device.

In one embodiment, in this embodiment of the present disclosure, the first TPMI may be a wideband transmitted precoding indicator, and represents that the terminal device can use $W_1$ corresponding to the first TPMI on an entire frequency band. The second TPMI is also a wideband transmitted precoding indicator, and represents that the terminal device can use $W_2$ corresponding to the second TPMI on the entire frequency band.

In one embodiment, the first TPMI may be a wideband transmitted precoding indicator, the second TPMI is a subband TPMI, and the subband TPMI is used to indicate $W_2$ used by the terminal device on the subband. That is, the terminal device may use different $W_2$ on different subbands.

In one embodiment, the first TPMI may be a subband transmitted precoding indicator, and the subband TPMI is used to indicate $W_1$ used by the terminal device on the subband. That is, the terminal device may use different $W_1$ on different subbands. The second TPMI is a wideband TPMI, and represents that the terminal device can use $W_2$ corresponding to the second TPMI on an entire frequency band.

In a second possible implementation of this embodiment, the precoding matrix information includes a fourth TPMI of a matrix $W_P$, the fourth TPMI is used to represent a matrix $W_1$ of a phase correlation between different first antenna port groups and a matrix $W_2$ equals the first precoding matrix w corresponding to the first antenna port group, and each first antenna port group corresponds to the same first precoding matrix w. A quantity of rows of $W_P$ equals a total quantity of all antenna ports in the antenna port group set, and a quantity of columns of $W_P$ equals a quantity of transmission layers between the access network device and the terminal device.

Specifically, in this implementation, the access network device and the terminal device share a new codebook, and the new codebook is the codebook provided in the present disclosure. After the access network device selects the antenna port group set for the terminal device, the access network device performs channel estimation based on a reference signal corresponding to the antenna port group set, to obtain a channel estimation result H corresponding to the antenna port group set, and determines, by using H, $W_P$ in the new codebook preset by the access network device. For example, the access network device may determine, based on the channel estimation result H, a matrix closet to a unitary matrix obtained after SVD decomposition is performed on the channel matrix H, use the matrix as $W_P$, and then determine the fourth TPMI corresponding to $W_P$.

The access network device then informs the terminal device of the fourth TPMI of the matrix $W_P$. Because the access network device side and the terminal device side share the foregoing new codebook, after receiving the fourth TPMI, the terminal device learns of, with reference to the previously received indication information, a quantity of antenna port groups used for sending, can determine the quantity of rows of $W_P$, and then learns of the fourth TPMI found from the foregoing new codebook, to obtain the matrix $W_P$.

In one embodiment, in this implementation, $W_P=W=W_1 \otimes W_2$. In this case, $$\begin{bmatrix} 1 \\ e^{j\varphi_1} \\ \Lambda \\ e^{j\varphi_{K-1}} \end{bmatrix}.$$

Alternatively, $W_P=W_1 \times W_2$, and in this case, $$W_1 = \begin{bmatrix} 1 \\ e^{j\varphi_1} \\ \Lambda \\ e^{j\varphi_{K-1}} \end{bmatrix} \otimes I_N.$$

Content of the matrix $W_1$ and the matrix $W_2$ is the same as that in the first possible implementation, and $W_P=W$. The foregoing new codebook reflects a correspondence between $W_P$ and the fourth TPMI. Herein, $W_P=W_1 \otimes W_2$ or $W_P=W_1 \times W_2$ represents only two different split manners of $W_P$. The present disclosure is not limited thereto.

According to the information transmission method provided in the present disclosure, the access network device informs the terminal device of the precoding matrix information for determining the precoding matrix W. The precoding matrix information considers the phase correlation between different first antenna port groups, thereby improving an inter-layer interference suppression capability when the terminal device transmits uplink data by using the precoding matrix W. In addition, the access network device does not need to transmit the explicit precoding matrix W to the terminal device, and instead, the terminal device obtains the precoding matrix W through calculation based on the precoding matrix information, thereby reducing air interface overheads for transmitting the precoding matrix. In addition, for the first possible implementation, because an uplink in a 5G system supports multi-carrier transmission, and may support bandwidth larger than 100 M, a problem of frequency selective fading exists. In existing LTE, a TPMI in downlink DCI is full bandwidth indication information. That is, one precoding matrix is used for the entire frequency band. In the present disclosure, a frequency selection characteristic in a 5G system is considered. In the 5G system, by using different subband TPMIs, different precoding matrices can be used on different frequency bands, satisfying a data transmission requirement in the 5G system.

Figure 5:
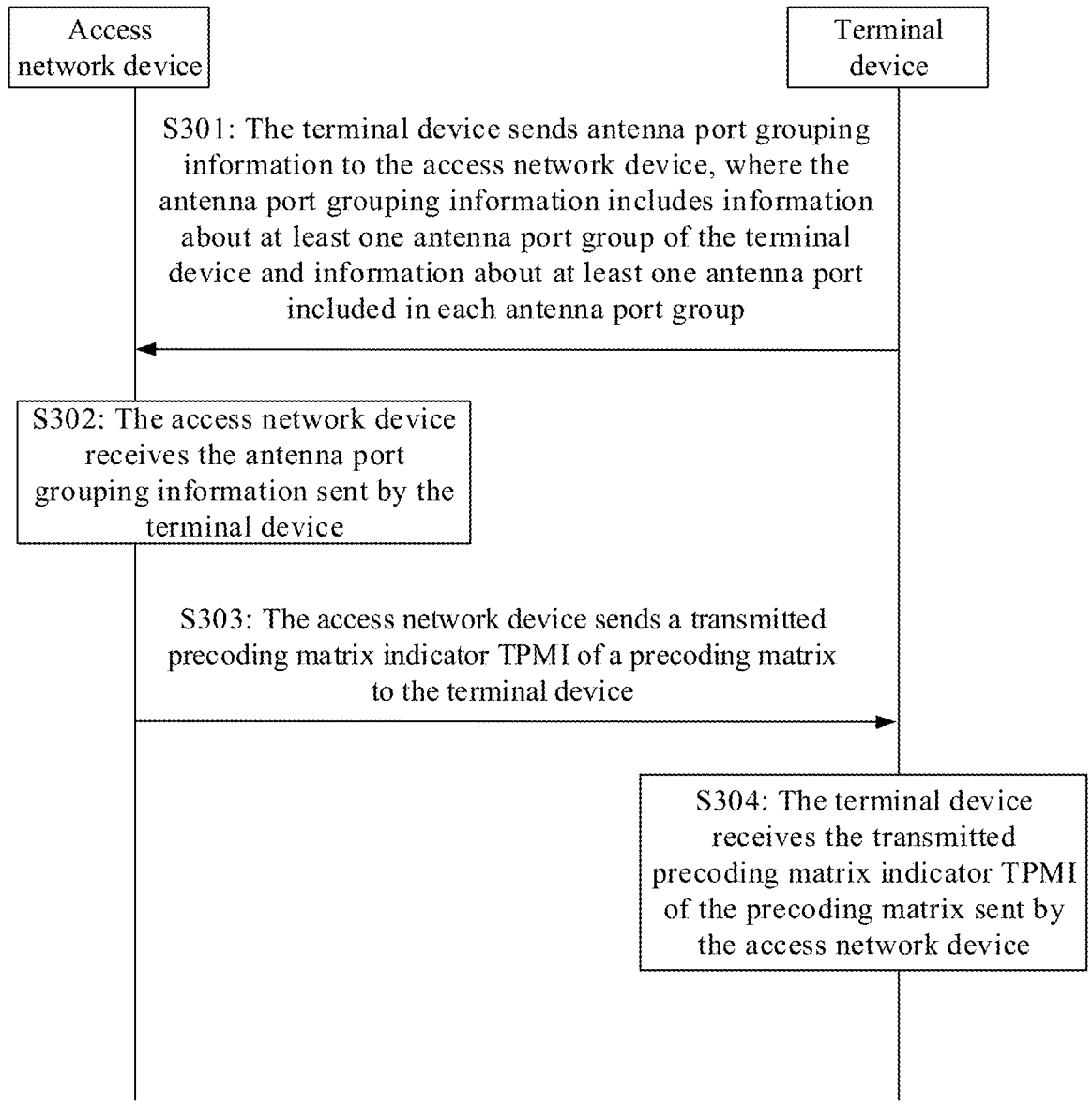
FIG. 5 is a signaling flowchart of Embodiment 3 of an information transmission method according to the present disclosure.

FIG. 5 is a signaling flowchart of Embodiment 3 of an information transmission method according to the present disclosure. This embodiment relates to a specific process in which a terminal device reports antenna port grouping information to an access network device, so that the access network device sends, to the terminal device, a TPMI of a precoding matrix W that needs to be used when the terminal device transmits uplink data. As shown in FIG. 5, the method includes the following operations.

Operation S301: The terminal device sends the antenna port grouping information to the access network device, where the antenna port grouping information includes information about at least one antenna port group of the terminal device and information about at least one antenna port included in each antenna port group.

Operation S302: The access network device receives the antenna port grouping information sent by the terminal device.

Specifically, for specific descriptions of S301 and S302, refer to specific processes of S101 and S102 in Embodiment 1, and details are not described herein again.

Operation S303: The access network device sends the transmitted precoding matrix indicator (TPMI) of the precoding matrix W to the terminal device.

W is a precoding matrix related to a first precoding matrix w corresponding to a first antenna port group in an antenna port group set, a phase correlation between different first antenna port groups, and the antenna port group set, the antenna port group set includes at least one first antenna port group, the first antenna port group is one of antenna port groups indicated by the antenna port grouping information, and each first antenna port group corresponds to the same first precoding matrix w. A quantity of rows of W equals a total quantity of antenna ports of the terminal device, and a quantity of columns of W equals a quantity of transmission layers between the access network device and the terminal device.

Operation S304: The terminal device receives the transmitted precoding matrix indicator (TPMI) of the precoding matrix W that is sent by the access network device.

Specifically, after the access network device receives the antenna port grouping information, in one embodiment, the access network device may determine whether some antenna ports of the terminal device meet a preset condition, to determine whether to select, for the terminal device, an antenna port group set suitable for sending. For descriptions of the preset condition and a selection process of the antenna port group set, refer to descriptions of S103, and details are not described herein again.

It should be noted that in this implementation, the access network device and the terminal device share a new codebook, and the new codebook is the codebook provided in the present disclosure. All precoding matrices in the codebook consider a first antenna port group selected by the access network device for the terminal device, a phase correlation between selected first antenna port groups, and the precoding matrix corresponding to the first antenna port groups. Each matrix in such a codebook corresponds to one TPMI.

The access network device performs channel estimation based on a reference signal sent by the terminal device, to obtain a channel estimation result H corresponding to all antenna port group sets, and determines, by using H, W in the new codebook preset by the access network device. For example, the access network device may determine, based on the channel estimation result H, a matrix closet to a unitary matrix obtained after SVD decomposition is performed on the channel matrix H, uses the matrix as W, and then determines a TPMI corresponding to W.

The access network device then informs the terminal device of the TPMI of W. Because the access network device side and the terminal device side share the foregoing new codebook, after receiving the TPMI of W, the terminal device finds the TPMI of W from the foregoing new codebook, to obtain the matrix W.

In one embodiment, the precoding matrix W may alternatively be denoted as $W=W_0 \otimes (W_1 \times W_2)$, content of a matrix $W_1$ and a matrix $W_2$ is the same as that in the first possible implementation, and $W_0$ is the foregoing antenna port selection matrix. In this manner, $$W_1 = \begin{bmatrix} 1 \\ e^{j\varphi_1} \\ \Lambda \\ e^{j\varphi_{K-1}} \end{bmatrix} \otimes I_N.$$

It should be noted that, each matrix in $W=W_0 \otimes (W_1 \times W_2)$ represents only one split manner of W, and the present disclosure is not limited thereto. The new codebook in this embodiment reflects a correspondence between W and the TPMI of W, that is, a correspondence between a final multiplication result and the TPMI of W.

According to the information transmission method provided in the present disclosure, the access network device informs the terminal device of the TPMI used to determine the precoding matrix W. The precoding matrix W considers a block situation of different first antenna port groups and the phase correlation between different first antenna port groups, thereby improving an inter-layer interference suppression capability when the terminal device transmits uplink data by using the precoding matrix W, and improving uplink sending power efficiency.

Figure 6:
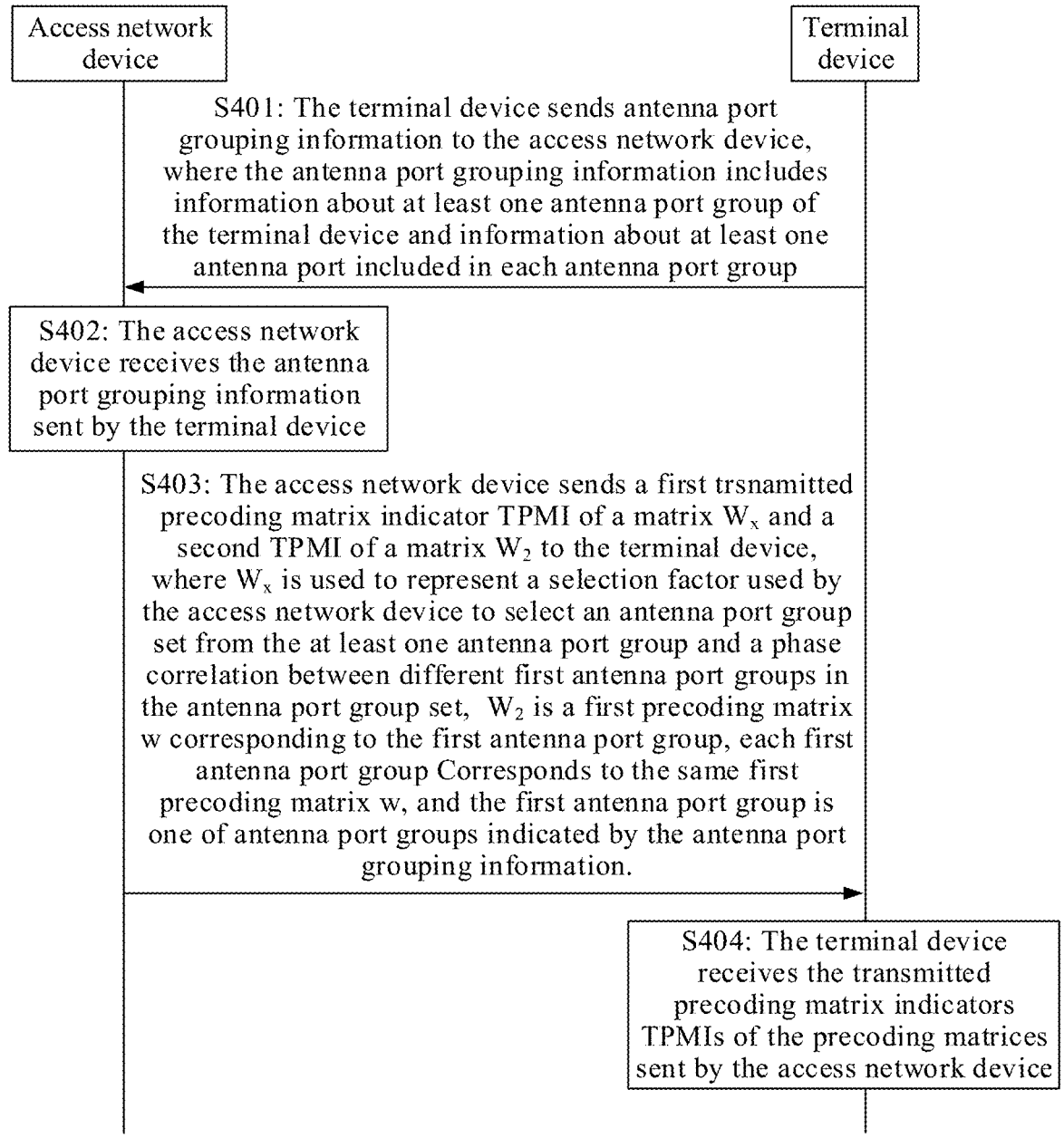
FIG. 6 is a signaling flowchart of Embodiment 4 of an information transmission method according to the present disclosure.

FIG. 6 is a signaling flowchart of Embodiment 4 of an information transmission method according to the present disclosure. This embodiment relates to a specific process in which a terminal device reports antenna port grouping information to an access network device, so that the access network device sends precoding matrix information to the terminal device, and the terminal device determines, based on the precoding matrix information, a precoding matrix W that needs to be used when the terminal device transmits uplink data. As shown in FIG. 6, the method includes the following operations.

Operation S401: The terminal device sends the antenna port grouping information to the access network device, where the antenna port grouping information includes information about at least one antenna port group of the terminal device and information about at least one antenna port included in each antenna port group, or information about at least one antenna port group of the terminal device and information about antenna ports of the terminal device.

The terminal device reports the antenna port grouping information to the access network device. The antenna port grouping information may include the information about the at least one antenna port group of the terminal device and the information about the at least one antenna port included in each antenna port group. That is, the terminal device informs the access network device of a quantity of antenna port groups on the terminal device and a quantity of antenna ports in each antenna port group. Alternatively, the antenna port grouping information may include the information about the at least one antenna port group of the terminal device and information about a total quantity of the antenna ports, and the access network device may obtain, based on the information about the total quantity of the antenna ports and the information about the at least one antenna port group, the information about the at least one antenna port included in each antenna port group.

In one embodiment, the access network device may determine, based on the information about the total quantity of the antenna ports and the information about the at least one antenna port group and a correspondence between an antenna port and an antenna port group, the information about the at least one antenna port included in each antenna port group. For example, the correspondence between an antenna port and an antenna port group may be that a quantity of antenna ports included in each antenna port group is a quotient obtained by dividing the total quantity of the antenna ports by the quantity of antenna port groups. For example, if the terminal device reports that the total quantity of the antenna ports is 8, and the antenna ports are grouped into two antenna port groups, the quantity of antenna ports included in each antenna port group is 8/2=4. Alternatively, the correspondence may be another consistent rule between the access network device and the terminal device. This is not limited herein.

Operation S402: The access network device receives the antenna port grouping information sent by the terminal device.

Specifically, for specific descriptions of S401 and S402, refer to descriptions of S101 and S102 in Embodiment 1, and details are not described herein again.

Operation S403: The access network device sends a first transmitted precoding matrix indicator (TPMI) of a matrix $W_x$ and a second TPMI of a matrix $W_2$ to the terminal device, where $W_x$ is used to represent a selection factor used by the access network device to select an antenna port group set from the at least one antenna port group and a phase correlation between different first antenna port groups in the antenna port group set, $W_2$ is a first precoding matrix w corresponding to the first antenna port group, each first antenna port group corresponds to the same first precoding matrix w, and the first antenna port group is one of antenna port groups indicated by the antenna port grouping information. The first TPMI and the second TPMI are used to determine the precoding matrix W.

The access network device performs channel estimation based on a reference signal sent by the terminal device, to obtain a channel estimation result H corresponding to all antenna port group sets, and respectively determines, by using H, the matrix $W_x$ and the matrix $W_2$ in a first codebook (the first codebook is a codebook related to a correspondence between the matrix $W_x$ and the first TPMI) and a second codebook (the second codebook is a codebook related to a correspondence between the matrix $W_2$ and the second TPMI) that are preset by the access network device. For example, the access network device may determine, based on a result of multiplying the matrix $W_x$ by the matrix $W_2$, a multiplication result closet to a unitary matrix obtained after SVD decomposition is performed on the channel matrix H, and then determines the matrix $W_x$ and the matrix $W_2$ based on the closest multiplication result, to determine the first TPMI and the second TPMI. The access network device then informs the terminal device of the first TPMI of the matrix $W_x$ and the second TPMI of the matrix $W_2$.

Operation S404: The terminal device receives the first TPMI of the matrix $W_x$ and the second TPMI of the matrix $W_2$ that are sent by the access network device.

Because an access network device side and a terminal device side share the first codebook and the second codebook, after receiving the first TPMI and the second TPMI, the terminal device may find the first TPMI from the first codebook, to obtain the matrix $W_x$; and find the second TPMI from the second codebook, to obtain the matrix $W_2$. Finally, the terminal device can calculate the precoding matrix W based on the matrix $W_1$, the matrix $W_2$, and a corresponding formula. For explanation of the formula, refer to descriptions in the foregoing method embodiments.

In one embodiment, $W=W_x \otimes W_2$, a quantity of rows of W equals a total quantity of the antenna ports of the terminal device, a quantity of columns of W equals a quantity of transmission layers between the access network device and the terminal device, $W_x$ is a column vector, a corresponding quantity of rows of $W_x$ is a quantity of first antenna port groups in the antenna port group set, and a non-zero element has a modulus 1, in addition, a quantity of non-zero elements indicates a quantity of first antenna port groups selected for uplink transmission, and $W_2$=w.

In one embodiment, in this embodiment of the present disclosure, the first TPMI may be a wideband transmitted precoding indicator, and represents that the terminal device can use $W_x$ corresponding to the first TPMI on an entire frequency band. The second TPMI is also a wideband transmitted precoding indicator, and represents that the terminal device can use $W_2$ corresponding to the second TPMI on the entire frequency band.

In one embodiment, the first TPMI may be a wideband transmitted precoding indicator, the second TPMI is a subband TPMI, and the subband TPMI is used to indicate $W_2$ used by the terminal device on the subband. That is, the terminal device may use different $W_2$ on different subbands.

In one embodiment, the first TPMI may be a subband transmitted precoding indicator, and the subband TPMI is used to indicate $W_x$ used by the terminal device on the subband. That is, the terminal device may use different $W_x$ on different subbands. The second TPMI is a wideband TPMI, and represents that the terminal device can use $W_2$ corresponding to the second TPMI on an entire frequency band.

According to the information transmission method provided in the present disclosure, the access network device informs the terminal device of the first TPMI and the second TPMI that are used to determine the precoding matrix W. $W_x$ corresponding to the first TPMI considers the phase correlation between different first antenna port groups, thereby improving an inter-layer interference suppression capability when the terminal device transmits uplink data by using the precoding matrix W. In addition, the access network device does not need to transmit the explicit precoding matrix W to the terminal device, and instead, the terminal device obtains the precoding matrix W through calculation based on the precoding matrix information, thereby reducing air interface overheads for transmitting the precoding matrix.

Another embodiment of the present disclosure further provides an information transmission method. In this embodiment, an access network device does not select an antenna port group set for a terminal device. The method is specifically as follows:

The terminal device reports antenna port grouping information to the access network device (the grouping information is used by default to inform the access network device that antenna ports in a same antenna port group perform sending simultaneously), and the access network device performs channel estimation based on a reference signal corresponding to an antenna port group indicated in the antenna port grouping information, to obtain a channel estimation result H corresponding to the antenna port group indicated in the antenna port grouping information. In this embodiment, the access network device and the terminal device share two codebooks: a first codebook and a second codebook. The first codebook is a correspondence between a phase correlation matrix $W_m$ and a first TPMI. Different from the foregoing embodiments, a quantity of rows of $W_m$ in this embodiment equals a total quantity of all antenna port groups of the terminal device. The second codebook is a correspondence between $W_2$ and a second TPMI, and $W_2$ herein is a matrix w" that is in an existing codebook and that corresponds to a quantity of antenna ports in one antenna port group. That is, the second codebook is the existing codebook.

Therefore, the access network device may respectively determine, by using H, the matrix $W_m$ and the matrix $W_2$ in the preset first codebook and the preset second codebook. For example, the access network device may determine, based on a result of multiplying the matrix $W_m$ by the matrix $W_2$, a multiplication result closet to a unitary matrix obtained after SVD decomposition is performed on the channel matrix H, and then determine the matrix $W_m$ and the matrix $W_2$ based on the closest multiplication result, to determine the first TPMI and the second TPMI.

The access network device then informs the terminal device of the first TPMI of the matrix $W_m$ and the second TPMI of the matrix $W_2$. Because the access network device side and the terminal device side share the first codebook and the second codebook, the terminal device may determine the matrix $W_m$ and the matrix $W_2$ based on the first TPMI and the second TPMI, and can calculate a precoding matrix W based on the matrix $W_m$, the matrix $W_2$ and a corresponding formula. In one embodiment, for explanation of the "corresponding formula" mentioned herein, refer to descriptions in the foregoing embodiments, and details are not described herein again.

In one embodiment, $W=W_m \otimes W_2$, $W_m$ equals A in the foregoing embodiments, and $W_2$ is w in the foregoing embodiments.

In one embodiment, in this embodiment of the present disclosure, the first TPMI may be a wideband transmitted precoding indicator, and represents that the terminal device can use $W_m$ corresponding to the first TPMI on an entire frequency band. The second TPMI is also a wideband transmitted precoding indicator, and represents that the terminal device can use $W_2$ corresponding to the second TPMI on the entire frequency band. In one embodiment, the first TPMI may be a wideband transmitted precoding indicator, the second TPMI is a subband TPMI, and the subband TPMI is used to indicate $W_2$ used by the terminal device on the subband. That is, the terminal device may use different $W_2$ on different subbands.

In one embodiment, the first TPMI may be a subband transmitted precoding indicator, and the subband TPMI is used to indicate $W_m$ used by the terminal device on the subband. That is, the terminal device may use different $W_m$ on different subbands. The second TPMI is a wideband TPMI, and represents that the terminal device can use $W_2$ corresponding to the second TPMI on an entire frequency band.

It can be learned from the foregoing descriptions that W provided in the present disclosure considers a phase correlation between antenna port groups of the terminal device. In this way, when the terminal device precodes uplink data by using W, an inter-layer interference suppression effect is better.

Figure 7:
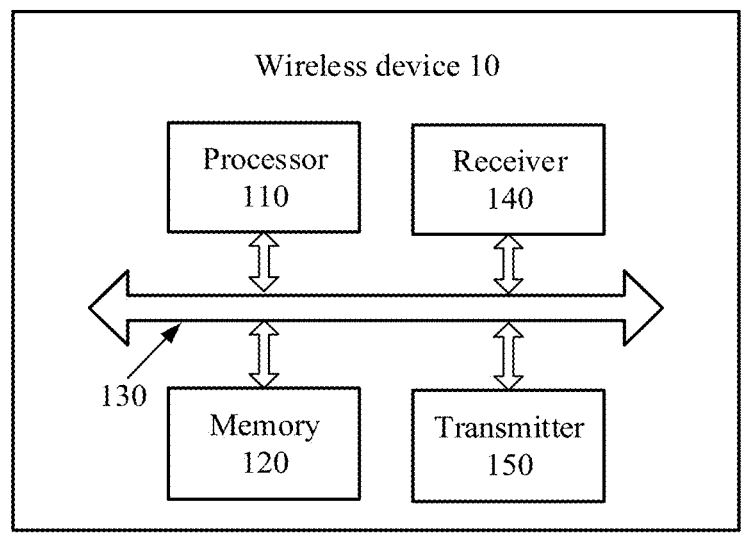
FIG. 7 is a schematic diagram of an information transmission apparatus (for example, a terminal device) according to an embodiment of the present disclosure.

According to the foregoing methods, as shown in FIG. 7, an embodiment of the present disclosure further provides an information transmission apparatus, and the apparatus may be a wireless device 10. The wireless device 10 may correspond to the terminal device in the foregoing methods.

The apparatus may include a processor 110 and a memory 120. Further, the apparatus may further include a receiver 140 and a transmitter 150. Further, the apparatus may include a bus system 130. The processor 110, the memory 120, the receiver 140, and the transmitter 150 may be connected by using the bus system 130.

The memory 120 is configured to store an instruction. The processor 110 is configured to execute the instruction stored in the memory 120, to control the receiver 140 to receive a signal and control the transmitter 150 to send a signal, so as to complete operations of the terminal device in the foregoing methods. The receiver 140 and the transmitter 150 may be a same physical entity or different physical entities. When the receiver 140 and the transmitter 150 are a same physical entity, the receiver 140 and the transmitter 150 may be collectively referred to as a transceiver. The memory 120 may be integrated into the processor 110, or may be separated from the processor 110.

In an implementation, functions of the receiver 140 and the transmitter 150 may be implemented by using a transceiver circuit or a dedicated transceiver chip. The processor 110 may be implemented by using a dedicated processing chip, processing circuit, or processor, or a general-purpose chip.

In another implementation, the wireless device provided in this embodiment of the present disclosure may be implemented in a form of a general-purpose computer. That is, program code for implementing functions of the processor 110, the receiver 140, and the transmitter 150 is stored in the memory, and a general-purpose processor implements the functions of the processor 110, the receiver 140, and the transmitter 150 by executing the code in the memory.

For a concept, an explanation, detailed descriptions, and other operations that are related to the apparatus and the technical solutions provided in this embodiment of the present disclosure, refer to descriptions about the content in the foregoing methods or in another embodiment. Details are not described herein again.

Figure 8:
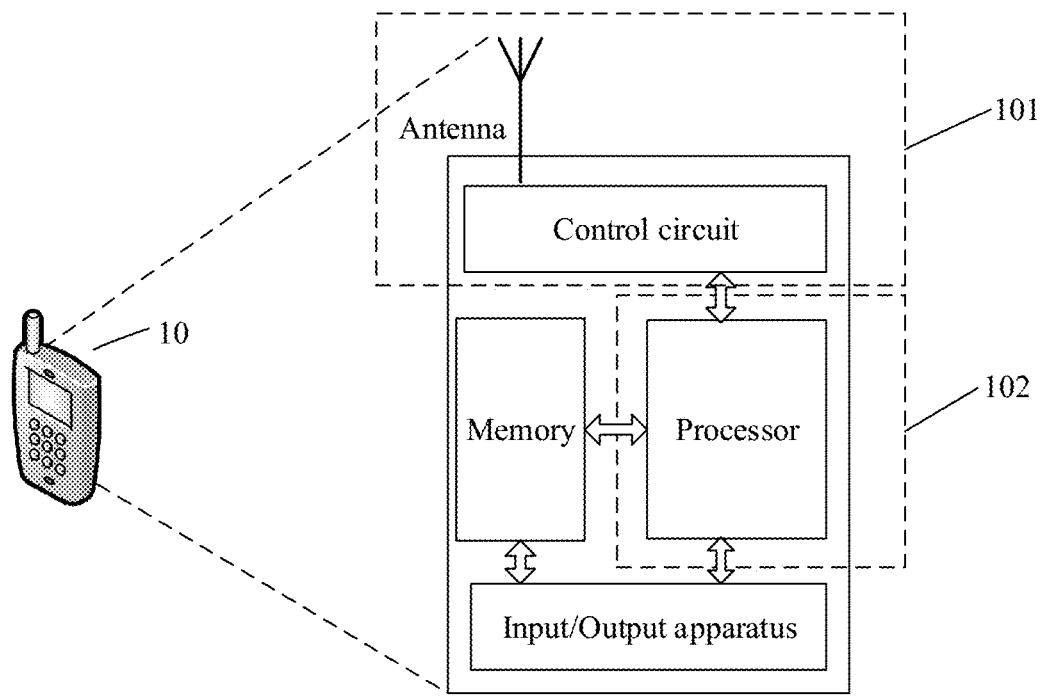
FIG. 8 is a schematic structural diagram of a terminal device according to an embodiment of the present disclosure.

FIG. 8 is a schematic structural diagram of a terminal device. The terminal device is applicable to the system shown in FIG. 1. For ease of description, FIG. 8 shows only main components of the user equipment. As shown in FIG. 8, the terminal device 10 includes a processor, a memory, a control circuit, an antenna, and an input/output apparatus. The processor is mainly configured to: process a communications protocol and communication data, control the entire terminal device, execute a software program, and process data of the software program, for example, configured to support the terminal device in executing actions described in FIG. 2. The memory is mainly configured to store the software program and data, for example, store the codebooks described in the foregoing embodiments. The control circuit is mainly configured to: perform conversion between a baseband signal and a radio frequency signal, and process the radio frequency signal. The control circuit together with the antenna may also be referred to as a transceiver that is mainly configured to receive/send a radio frequency signal in an electromagnetic wave form. The input/output apparatus such as a touchscreen, a display screen, or a keyboard is mainly configured to: receive data entered by a user, and output data to the user.

After the terminal device is powered on, the processor may read a software program in a storage unit, explain and execute an instruction of the software program, and process data of the software program. When data needs to be sent in a wireless manner, the processor performs baseband processing on the to-be-sent data, and then outputs a baseband signal to a radio frequency circuit. After performing radio frequency processing on the baseband signal, the radio frequency circuit sends a radio frequency signal in an electromagnetic wave form by using the antenna. When data is sent to the user equipment, the radio frequency circuit receives a radio frequency signal by using the antenna, converts the radio frequency signal into a baseband signal, and outputs the baseband signal to the processor. The processor converts the baseband signal into data, and processes the data.

A person skilled in the art may understand that, for ease of description, FIG. 8 shows only one memory and one processor. Actually, the terminal device may include a plurality of processors and a plurality of memories. The memory may also be referred to as a storage medium, a storage device, or the like. This is not limited in this embodiment of the present disclosure.

In one embodiment, the processor may include a baseband processor and a central processing unit. The baseband processor is mainly configured to process the communications protocol and the communication data. The central processing unit is mainly configured to: control the entire user equipment, execute the software program, and process the data of the software program. Functions of the baseband processor and the central processing unit are integrated into the processor in FIG. 8. A person skilled in the art may understand that alternatively, the baseband processor and the central processing unit each may be an independent processor, and are interconnected by using a technology such as a bus. A person skilled in the art may understand that the terminal device may include a plurality of baseband processors to adapt to different network standards, the user equipment may include a plurality of central processing units to enhance processing capabilities of the user equipment, and various components of the user equipment may be connected by using various buses. The baseband processor may also be expressed as a baseband processing circuit or a baseband processing chip. The central processing unit may also be expressed as a central processing circuit or a central processing chip. A function of processing the communications protocol and the communication data may be built into the processor, or may be stored in the storage unit in a form of a software program, so that the processor executes the software program to implement a baseband processing function.

For example, in this embodiment of the present disclosure, the antenna and the control circuit that have receiving and sending functions may be considered as a transceiver unit 101 of the terminal device 10, and the processor having a processing function may be considered as a processing unit 102 of the terminal device 10. As shown in FIG. 8, the terminal device 10 includes the transceiver unit 101 and the processing unit 102. The transceiver unit may also be referred to as a transceiver, a transceiver apparatus, or the like. In one embodiment, a component that is in the transceiver unit 101 and is configured to implement a receiving function may be considered as a receiving unit, and a component that is in the transceiver unit 101 and is configured to implement a sending function may be considered as a sending unit. In other words, the transceiver unit 101 includes the receiving unit and the sending unit. For example, the receiving unit may also be referred to as a receiver, a receiver circuit, or the like, and the sending unit may be referred to as a transmitter, a transmit circuit, or the like.

Figure 9:
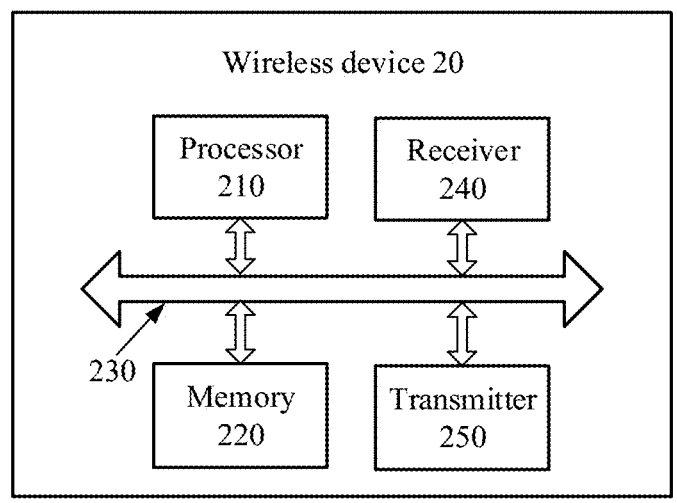
FIG. 9 is a schematic diagram of an information transmission apparatus (for example, an access network device) according to an embodiment of the present disclosure.

According to the foregoing methods, as shown in FIG. 9, an embodiment of the present disclosure further provides an information transmission apparatus, the apparatus may be a wireless device 20, and the wireless device 20 correspond to the access network device in the foregoing methods. The apparatus may include a processor 210 and a memory 220. Further, the apparatus may further include a receiver 240 and a transmitter 250. Still further, the apparatus may further include a bus system 230.

The processor 210, the memory 220, the receiver 240, and the transmitter 250 are connected to each other by using the bus system 230. The memory 220 is configured to store an instruction. The processor 210 is configured to execute the instruction stored in the memory 220, to control the receiver 240 to receive a signal and control the transmitter 250 to send a signal, so as to complete operations of the access network device in the foregoing methods. The receiver 240 and the transmitter 250 may be a same physical entity or different physical entities. When the receiver 240 and the transmitter 250 are a same physical entity, the receiver 240 and the transmitter 250 may be collectively referred to as a transceiver. The memory 220 may be integrated into the processor 210, or may be separated from the processor 210.

In an implementation, functions of the receiver 240 and the transmitter 250 may be implemented by using a transceiver circuit or a dedicated transceiver chip. The processor 210 may be implemented by using a dedicated processing chip, processing circuit, or processor, or a general-purpose chip.

In another implementation, the wireless device provided in this embodiment of the present disclosure may be implemented in a form of a general-purpose computer. That is, program code for implementing functions of the processor 210, the receiver 240, and the transmitter 250 is stored in the memory, and a general-purpose processor implements the functions of the processor 210, the receiver 240, and the transmitter 250 by executing the code in the memory.

For a concept, an explanation, detailed descriptions, and other operations that are related to the apparatus and the technical solutions provided in this embodiment of the present disclosure, refer to descriptions about the content in the foregoing methods or in another embodiment. Details are not described herein again.

Figure 10:
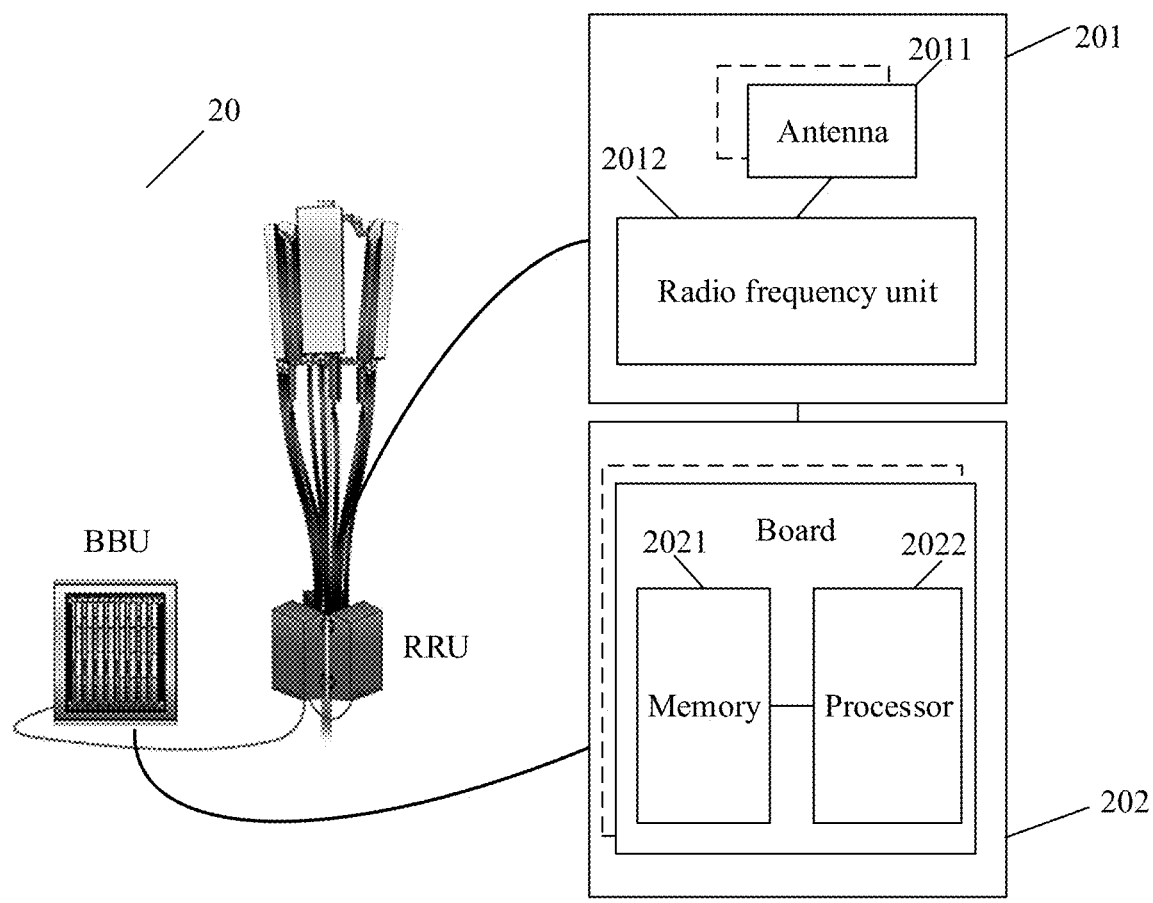
FIG. 10 is a schematic structural diagram of an access network device according to an embodiment of the present disclosure.

According to the foregoing methods, as shown in FIG. 10, an embodiment of the present disclosure further provides a schematic structural diagram of an access network device, for example, a base station.

The base station is applicable to the system shown in FIG. 1. The base station 20 includes one or more radio frequency units, such as a remote radio unit (RRU) 201 and one or more baseband units (BBU) (also referred to as a digital unit, DU) 202. The RRU 201 may be referred to as a transceiver unit, a transceiver, a transceiver circuit, a transceiver, or the like, and may include at least one antenna 2011 and a radio frequency unit 2012. The RRU 201 is mainly configured to receive and send a radio frequency signal and perform conversion between a radio frequency signal and a baseband signal, for example, configured to send the signaling indication and/or reference signal in the foregoing embodiments to user equipment. The BBU 202 is mainly configured to: perform baseband processing, control the base station, and the like. The RRU 201 and the BBU 202 may be physically disposed together, or may be physically separated, in other words, in a distributed base station.

The BBU 202 is a control center of the base station, or may be referred to as a processing unit, and is mainly configured to complete baseband processing functions such as channel coding, multiplexing, modulation, and spectrum spreading. For example, the BBU (the processing unit) may be configured to control the base station to execute the procedure shown in FIG. 3.

In an example, the BBU 202 may include one or more boards, and a plurality of boards may jointly support a radio access network (such as an LTE network) of a single access standard, or may separately support radio access networks of different access standards. The BBU 202 further includes a memory 2021 and a processor 2022. The memory 2021 is configured to store a suitable instruction and suitable data. For example, the memory 2021 stores a correspondence between information about a TPMI and a transmission precoding matrix in the foregoing embodiment. The processor 2022 is configured to control the base station to perform a suitable action, for example, configured to control the base station to perform actions shown in FIG. 3. The memory 2021 and the processor 2022 may serve one or more boards. In other words, a memory and a processor may be disposed on each board. Alternatively, a plurality of boards may share a same memory and a same processor. In addition, a suitable circuit may be further disposed on each board.

According to the method provided in the embodiments of the present disclosure, an embodiment of the present disclosure further provides a communications system, including the foregoing access network device and one or more terminal devices.

It should be understood that in the embodiments of the present disclosure, the processor may be a central processing unit (CPU), or the processor may be another general-purpose processor, a digital signal processor (DSP), an application-specific integrated circuit (ASIC), a field programmable gate array (FPGA), or another programmable logic device, discrete gate or transistor logic device, discrete hardware component, or the like. The general-purpose processor may be a microprocessor, or the processor may be any conventional processor or the like.

The memory may include a read-only memory and a random access memory, and provide an instruction and data to the processor. A part of the memory may further include a non-volatile random access memory.

The bus system may further include a power bus, a control bus, a status signal bus, and the like, in addition to a data bus. However, for clear description, various types of buses in the figure are marked as the bus system.

In an implementation process, operations in the foregoing methods can be implemented by using a hardware integrated logical circuit in the processor, or by using instructions in a form of software. The operations of the method disclosed with reference to the embodiments of the present disclosure may be directly performed by a hardware processor, or may be performed by using a combination of hardware in the processor and a software module. A software module may be located in a mature storage medium in the art, such as a random access memory, a flash memory, a read-only memory, a programmable read-only memory, an electrically erasable programmable memory, a register, or the like. The storage medium is located in the memory, and a processor reads information in the memory and completes the operations in the foregoing methods in combination with hardware of the processor. To avoid repetition, details are not described herein again.

It should further be understood that the numbers such as "first", "second", "third", and "fourth" in this specification are merely for distinguishing purposes for ease of description, and are not intended to limit the scope of the embodiments of the present disclosure.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in the embodiments of the present disclosure. The execution sequences of the processes should be determined according to functions and internal logic of the processes, and should not be construed as any limitation on the implementation processes of the embodiments of the present disclosure.

A person of ordinary skill in the art may be aware that, in combination with illustrative logical blocks described in the embodiments disclosed in this specification and operations may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present disclosure, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate components may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present disclosure may be integrated into one processing unit, or each of the units may exist alone physically, or two or more units are integrated into one unit.

All or some of the foregoing embodiments may be implemented by means of software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of the present disclosure are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. An apparatus, comprising a processor, wherein the processor is coupled to a memory, and the processor is configured to execute a program or an instruction stored in the memory, and when the processor executes the instruction stored in the memory, the apparatus is configured to perform the following:

sending antenna port grouping information to an access network device, wherein the antenna port grouping information comprises information about at least one antenna port group of a terminal device and information about at least one antenna port comprised in each antenna port group, or information about at least one antenna port group of the terminal device and information about antenna ports of the terminal device;

receiving indication information from the access network device, wherein the indication information is used to indicate an antenna port group set used by the terminal device to transmit uplink information at a first moment determined based on a moment the terminal device receives the indication information, wherein the antenna port group set is selected based on strength of a received reference signal, the antenna port group set comprises at least one first antenna port group, and the first antenna port group is one of antenna port groups indicated by the antenna port grouping information; and receiving precoding matrix information from the access network device, wherein the precoding matrix information is used to determine a precoding matrix W by the terminal device; wherein the precoding matrix information comprises a first transmitted precoding matrix indicator (TPMI) of a matrix $W_1$ and a second TPMI of a matrix $W_2$, or, the precoding matrix information comprises a fourth transmitted precoding matrix indicator (TPMI) of a matrix $W_P$;

wherein $W_1$ is used to represent a phase correlation between different first antenna port groups, $W_2$ is a first precoding matrix w corresponding to the first antenna port group, each first antenna port group corresponds to the same first precoding matrix w, and the first TPMI and the second TPMI are used to determine the precoding matrix W;

the precoding matrix W, the matrix $W_1$ and the matrix $W_2$ satisfying one of the following:

wherein $$W_1 = \begin{bmatrix} 1 \\ e^{j\varphi_1} \\ \dots \\ e^{j\varphi_{K-1}} \end{bmatrix},$$

and $W = W_1 \otimes W_2$, wherein K is a quantity of first antenna port groups in the antenna port group set, $\varphi_k$ is a phase correlation factor between a $k^{th}$ first antenna port group and a $1^{st}$ first antenna port group, and a value range of k is [1, K−1]; and a quantity of rows of $W_1$ equals the quantity of first antenna port groups in the antenna port group set, a quantity of rows of $W_2$ equals a total quantity of antenna ports in the first antenna port group, a quantity of columns of $W_1$ is 1, and a quantity of columns of $W_2$ is a quantity of transmission layers between the access network device and the terminal device; or
wherein $$W_1 = \begin{bmatrix} 1 \\ e^{j\varphi_1} \\ \ldots \\ e^{j\varphi_{K-1}} \end{bmatrix} \otimes I_N,$$

and $W=W_1 \times W_2$, wherein $I_N$ is a unit matrix with N rows and N columns, N is a quantity of antenna ports in the first antenna port group, K is a quantity of first antenna port groups in the antenna port group set, $\varphi_k$ is a phase correlation factor between a $k^{th}$ first antenna port group and a $1^{st}$ first antenna port group, a value range of k is [1, K−1], a quantity of rows of $W_1$ equals a total quantity of all antenna ports in the antenna port group set, a quantity of rows of $W_2$ equals the total quantity of antenna ports in the first antenna port group, a quantity of columns of $W_1$ is the total quantity of antenna ports in the first antenna port group, and a quantity of columns of $W_2$ is a quantity of transmission layers between the access network device and the terminal device,
and wherein the fourth TPMI is used to represent the matrix $W_1$ and the matrix $W_2$ that equals the first precoding matrix w corresponding to the first antenna port group, and each first antenna port group corresponds to the same first precoding matrix w; and a quantity of rows of $W_p$ equals the total quantity of the all antenna ports in the antenna port group set, and a quantity of columns of $W_p$ equals the quantity of the transmission layers between the access network device and the terminal device.

2. The apparatus according to claim 1, wherein the indication information comprises at least one of antenna port selection matrix information, a medium access control control element (MAC CE), or at least one uplink sounding reference signal resource indicator (SRI), different antenna port selection matrix information corresponds to different antenna port group sets, different MAC CEs correspond to different antenna port group sets, and different SRIs correspond to different antenna port groups.

3. The apparatus according to claim 2, wherein the antenna port selection matrix information comprises an antenna port selection matrix or an identifier of the antenna port selection matrix.

4. The apparatus according to claim 3, wherein the antenna port selection matrix is a matrix with N rows and one column, some elements in the antenna port selection matrix are 0, one or more remaining elements are 1, and N is a quantity of antenna port groups reported by the terminal device.

5. The apparatus according to claim 1, wherein the first TPMI is a wideband transmitted precoding matrix indicator, and the second TPMI is a wideband transmitted precoding matrix indicator; or
the first TPMI is a wideband transmitted precoding matrix indicator, the second TPMI is a subband TPMI, and the subband TPMI is used to indicate $W_2$ used by the terminal device on a subband; or
the first TPMI is a subband transmitted precoding matrix indicator, and the second TPMI is a wideband transmitted precoding matrix indicator.

6. An apparatus, comprising a processor, wherein the processor is coupled to a memory, and the processor is configured to execute a program or an instruction stored in the memory, and when the processor executes the instruction stored in the memory, the apparatus is configured to perform the following:
receiving antenna port grouping information from a terminal device, wherein the antenna port grouping information comprises information about at least one antenna port group of the terminal device and information about at least one antenna port comprised in each antenna port group, or information about at least one antenna port group of the terminal device and information about antenna ports of the terminal device;
sending indication information to the terminal device based on the antenna port grouping information, wherein the indication information is used to indicate an antenna port group set used by the terminal device to transmit uplink information at a first moment determined based on a moment the terminal device receives the indication information, wherein the antenna port group set is selected based on strength of a received reference signal, the antenna port group set comprises at least one first antenna port group, and the first antenna port group is one of antenna port groups indicated by the antenna port grouping information; and
sending precoding matrix information to the terminal device, wherein the precoding matrix information is used for determination of a precoding matrix W in the terminal device; wherein the precoding matrix information comprises a first transmitted precoding matrix indicator (TPMI) of a matrix $W_1$ and a second TPMI of a matrix $W_2$, or, the precoding matrix information comprises a fourth transmitted precoding matrix indicator (TPMI) of a matrix $W_p$;
wherein $W_1$ is used to represent a phase correlation between different first antenna port groups, $W_2$ is a first precoding matrix w corresponding to the first antenna port group, each first antenna port group corresponds to the same first precoding matrix w, and the first TPMI and the second TPMI are used to determine the precoding matrix W;
the precoding matrix W, the matrix $W_1$ and the matrix $W_2$ satisfying one of the following:
wherein $$W_1 = \begin{bmatrix} 1 \\ e^{j\varphi_1} \\ \ldots \\ e^{j\varphi_{K-1}} \end{bmatrix},$$

and $W=W_1 \otimes W_2$, wherein K is a quantity of first antenna port groups in the antenna port group set, $\varphi_k$ is a phase correlation factor between a $k^{th}$ first antenna port group and a $1^{st}$ first antenna port group, and a value range of k is [1, K−1]; and a quantity of rows of $W_1$ equals the quantity of first antenna port groups in the antenna port group set, a quantity of rows of $W_2$ equals a total quantity of antenna ports in the first antenna port group, a quantity of columns of $W_1$ is 1, and a quantity of columns of $W_2$ is a quantity of transmission layers between the access network device and the terminal device; or
wherein $$W_1 = \begin{bmatrix} 1 \\ e^{j\varphi_1} \\ \cdots \\ e^{j\varphi_{K-1}} \end{bmatrix} \otimes I_N,$$

and $W=W_1 \times W_2$, wherein $I_N$ is a unit matrix with N rows and N columns, N is a quantity of antenna ports in the first antenna port group, K is a quantity of first antenna port groups in the antenna port group set, $\varphi_k$ is a phase correlation factor between a $k^{th}$ first antenna port group and a $1^{st}$ first antenna port group, a value range of k is [1, K−1], a quantity of rows of $W_1$ equals a total quantity of all antenna ports in the antenna port group set, a quantity of rows of $W_2$ equals the total quantity of antenna ports in the first antenna port group, a quantity of columns of $W_1$ is the total quantity of antenna ports in the first antenna port group, and a quantity of columns of $W_2$ is a quantity of transmission layers between the access network device and the terminal device;

and wherein the fourth TPMI is used to represent the matrix $W_1$ and the matrix $W_2$ that equals the first precoding matrix w corresponding to the first antenna port group, and each first antenna port group corresponds to the same first precoding matrix w; and a quantity of rows of $W_P$ equals the total quantity of the all antenna ports in the antenna port group set, and a quantity of columns of $W_P$ equals the quantity of the transmission layers between the access network device and the terminal device.

7. The apparatus according to claim 6, wherein the indication information comprises at least one of antenna port selection matrix information, a medium access control control element (MAC CE), or at least one uplink sounding reference signal resource indicator (SRI), different antenna port selection matrix information corresponds to different antenna port group sets, different MAC CEs correspond to different antenna port group sets, and different SRIs correspond to different antenna port groups.

8. The apparatus according to claim 7, wherein the antenna port selection matrix information comprises an antenna port selection matrix or an identifier of the antenna port selection matrix.

9. The apparatus according to claim 8, wherein the antenna port selection matrix is a matrix with N rows and one column, some elements in the antenna port selection matrix are 0, one or more remaining elements are 1, and N is a quantity of antenna port groups reported by the terminal device.

10. The apparatus according to claim 6, wherein the first TPMI is a wideband transmitted precoding matrix indicator, and the second TPMI is a wideband transmitted precoding matrix indicator; or the first TPMI is a wideband transmitted precoding matrix indicator, the second TPMI is a subband TPMI, and the subband TPMI is used to indicate $W_2$ used by the terminal device on a subband; or the first TPMI is a subband transmitted precoding matrix indicator, and the second TPMI is a wideband transmitted precoding matrix indicator.

11. An apparatus, comprising a processor, wherein the processor is coupled to a memory, and the processor is configured to execute a program or an instruction stored in the memory, and when the processor executes the instruction stored in the memory, the apparatus is configured to perform the following:

sending antenna port grouping information to an access network device, wherein the antenna port grouping information comprises information about at least one antenna port group of a terminal device and information about at least one antenna port comprised in each antenna port group, or information about at least one antenna port group of the terminal device and information about antenna ports of the terminal device; and receiving indication information from the terminal device based on the antenna port grouping information, wherein the indication information is used to indicate an antenna port group set used by the terminal device to transmit uplink information at a first moment determined based on a moment the terminal device receives the indication information, wherein the antenna port group set is selected based on strength of a received reference signal, wherein the indication information includes a first transmitted precoding matrix indicator TPMI of a matrix $W_x$ and a second TPMI of a matrix $W_2$ from the access network device, wherein $W_x$ is used to represent a selection factor used by the access network device to select an antenna port group set from the at least one antenna port group and a phase correlation between different first antenna port groups in the antenna port group set, $W_2$ is a first precoding matrix w corresponding to the first antenna port group, and each first antenna port group corresponds to the same first precoding matrix w; and the first antenna port group is one of antenna port groups indicated by the antenna port grouping information, and the first TPMI and the second TPMI are used to determine a precoding matrix W, wherein $W=W_x \otimes W_2$, a quantity of rows of $W_x$ equals a quantity of first antenna port groups in the antenna port group set, a quantity of columns of $W_x$ is 1, a quantity of rows of $W_2$ equals a total quantity of antenna ports in the first antenna port group, and a quantity of columns of $W_2$ is a quantity of transmission layers between the access network device and the terminal device; and M elements in $W_x$ are each a complex number of modulus 1, one or more remaining elements are 0, and M is the quantity of first antenna port groups in the antenna port group set; or wherein $W=W_x \times W_2$, a quantity of rows of $W_x$ equals a total quantity of all antenna ports of the terminal device, a quantity of columns of $W_x$ equals a total quantity of antenna ports in the first antenna port group, a quantity of rows of $W_2$ equals the total quantity of antenna ports in the first antenna port group, and a quantity of columns of $W_2$ is a quantity of transmission layers between the access network device and the terminal device; and all elements in a same row in $W_x$ are the same, M rows of elements in $W_x$ are each a complex number of modulus 1, other rows of elements are 0, and M is the quantity of first antenna port groups in the antenna port group set.

* * * * *